United States Patent
Aubrey et al.

(10) Patent No.: US 10,940,743 B2
(45) Date of Patent: Mar. 9, 2021

(54) LOAD BEARING TONNEAU COVER WITH INTEGRAL TRACK, IMPROVED LATCH TO VEHICLE AND CUSTOM FRAME ATTACHMENT

(71) Applicants: Advanced Metal Products, Inc., West Bountiful, UT (US); Patrick Richard Sessions, Meridian, ID (US)

(72) Inventors: Jennifer Aubrey, Bountiful, UT (US); David Rosal, West Bountiful, UT (US); Scott M. Packer, Highland, UT (US); Patrick Richard Sessions, Meridian, ID (US)

(73) Assignee: ADVANCED METAL PRODUCTS, INC., West Bountiful, UT (US)

( * ) Notice: Subject to any disclaimer, the term of this patent is extended or adjusted under 35 U.S.C. 154(b) by 72 days.

(21) Appl. No.: 16/452,274

(22) Filed: Jun. 25, 2019

(65) Prior Publication Data

US 2019/0308494 A1    Oct. 10, 2019

Related U.S. Application Data

(63) Continuation of application No. 15/831,200, filed on Dec. 4, 2017, now Pat. No. 10,328,778, which is a
(Continued)

(51) Int. Cl.
*B60J 7/14*      (2006.01)
*B60P 7/02*     (2006.01)
(Continued)

(52) U.S. Cl.
CPC ............... *B60J 7/141* (2013.01); *B60J 7/198* (2013.01); *B60P 7/02* (2013.01); *B60P 7/06* (2013.01);
(Continued)

(58) Field of Classification Search
CPC ........ B60J 7/141; B60J 7/1607; B60J 7/1621; B60P 7/02; B60P 7/06
(Continued)

(56) References Cited

U.S. PATENT DOCUMENTS

| 3,420,570 A | 1/1969 | Kunz |
| 3,765,717 A | 10/1973 | Garvert |

(Continued)

FOREIGN PATENT DOCUMENTS

| CA | 2412230 | 2/2002 |
| WO | WO0214096 | 2/2002 |

OTHER PUBLICATIONS https://diamondbackcovers.com/ DIAMONDBACK Covers web site p. 1-4.

*Primary Examiner* — Jason S Daniels
(74) *Attorney, Agent, or Firm* — Morriss O'Bryant Compagni Cannon, PLLC

(57) ABSTRACT

A system and method for providing a folding load bearing hard tonneau cover, wherein each folding section is constructed using friction stir welds for strength, stiffness and visual appeal, wherein edge extrusions may include an integral attachment track which is capable of sustaining high tie down loads, wherein a spring loaded latching system has the strength to react the moments generated by heavy loads on top of the tonneau cover, wherein installation does not require modification to the bed but instead uses a 2 bolt attachment system, and wherein the tonneau cover may carry heavy loads on top that are easy to secure, and wherein a custom carrying frame is easily attachable to the tonneau cover to enable large and heavy loads, even some that are longer than the pick-up bed, to be carried on the tonneau cover while enabling use of the pick-up bed for other cargo.

9 Claims, 30 Drawing Sheets

Related U.S. Application Data continuation-in-part of application No. 15/085,368, filed on Mar. 30, 2016, now Pat. No. 9,925,853.

(60) Provisional application No. 62/429,630, filed on Dec. 2, 2016, provisional application No. 62/139,957, filed on Mar. 30, 2015, provisional application No. 62/250,303, filed on Nov. 3, 2015.

(51) Int. Cl.
  *B60R 5/04* (2006.01)
  *B60J 7/19* (2006.01)
  *B60P 7/06* (2006.01)
  *B60J 7/12* (2006.01)
  *B60P 3/07* (2006.01)

(52) U.S. Cl.
  CPC .............. *B60R 5/045* (2013.01); *B60J 7/1204* (2013.01); *B60P 3/07* (2013.01)

(58) Field of Classification Search
  USPC ............. 296/100.01, 100.02, 100.06, 100.09
  See application file for complete search history.

(56) References Cited

U.S. PATENT DOCUMENTS

| | | |
|---|---|---|
| 3,936,077 A | 2/1976 | Bliek |
| 4,273,377 A | 6/1981 | Alexander |
| 4,285,539 A | 8/1981 | Cole |
| 4,313,636 A | 2/1982 | Deeds |
| 4,377,309 A | 3/1983 | Mengshoel |
| 4,394,100 A | 7/1983 | Sperlich |
| 4,418,954 A | 12/1983 | Buckley |
| 4,479,677 A | 10/1984 | Gulette et al. |
| 4,550,945 A | 11/1985 | Englehardt |
| 4,563,034 A | 1/1986 | Lamb |
| 4,573,730 A | 3/1986 | Gondert et al. |
| 4,639,033 A | 1/1987 | Wheatley et al. |
| 4,730,866 A | 3/1988 | Nett |
| 4,739,528 A | 4/1988 | Allen |
| 4,762,360 A | 8/1988 | Huber |
| 4,783,112 A | 11/1988 | Lovaas |
| 4,792,178 A | 12/1988 | Kokx |
| 4,792,179 A | 12/1988 | Stevens |
| 4,824,162 A | 4/1989 | Geisler et al. |
| 4,838,602 A | 6/1989 | Nett |
| 4,848,824 A | 7/1989 | Smith et al. |
| 4,861,092 A | 8/1989 | Bogard |
| 4,941,705 A | 7/1990 | Wurtz |
| 5,058,652 A | 10/1991 | Wheatley et al. |
| 5,067,768 A | 11/1991 | Fischbach |
| 5,087,913 A | 2/1992 | Eastman |
| 5,098,148 A | 3/1992 | Hoban |
| 5,121,960 A | 6/1992 | Wheatley |
| 5,301,995 A | 4/1994 | Isler |
| 5,310,238 A | 5/1994 | Wheatley |
| 5,316,357 A | 5/1994 | Schroeder |
| 5,322,336 A | 6/1994 | Isler |
| 5,365,994 A | 11/1994 | Wheatley et al. |
| 5,427,428 A | 6/1995 | Ericson et al. |
| 5,460,423 A | 10/1995 | Kersting et al. |
| 5,522,635 A | 6/1996 | Downey |
| 5,595,417 A | 1/1997 | Thoman et al. |
| 5,632,522 A | 5/1997 | Gaitan et al. |
| 5,636,893 A | 6/1997 | Wheatley et al. |
| 5,688,017 A | 11/1997 | Bennett |
| 5,795,011 A | 8/1998 | Flentge |
| 5,851,047 A | 12/1998 | Adams et al. |
| 5,857,729 A | 1/1999 | Bogard |
| 5,887,934 A | 3/1999 | Smith |
| 5,975,618 A | 12/1999 | Rippberger |
| 6,082,806 A | 7/2000 | Bogard |
| 6,095,588 A | 8/2000 | Rodosta |
| 6,126,225 A | 10/2000 | Griffin |
| 6,126,226 A | 10/2000 | Wheatley |
| 6,170,900 B1 | 1/2001 | Kooiker |
| 6,183,035 B1 | 2/2001 | Rusu et al. |
| 6,227,602 B1 | 5/2001 | Bogard |
| 6,527,326 B2 | 3/2003 | Henderson |
| 6,565,141 B1 | 5/2003 | Steffens et al. |
| 6,702,359 B2 | 3/2004 | Armstrong et al. |
| 6,883,855 B2 | 4/2005 | Chverchko et al. |
| 7,246,839 B1 | 7/2007 | Nyberg |
| 7,484,788 B2 | 2/2009 | Calder et al. |
| D620,877 S | 8/2010 | Rusher et al. |
| 8,262,148 B2 | 9/2012 | Rusher et al. |
| 8,262,748 B2 | 9/2012 | Moncrieff et al. |
| 8,348,328 B2 | 1/2013 | Walser et al. |
| 9,381,794 B2 | 7/2016 | Gomes et al. |
| 9,487,248 B1 | 11/2016 | Buckhalt et al. |
| 9,925,853 B2 | 3/2018 | Aubrey et al. |
| 10,328,778 B2 | 6/2019 | Aubrey et al. |
| 2002/0145299 A1 | 10/2002 | Henderson |
| 2004/0134162 A1 | 7/2004 | Douglas |
| 2010/0140973 A1 | 6/2010 | Duncan |
| 2011/0062744 A1 | 3/2011 | Schrader et al. |
| 2013/0093206 A1 | 4/2013 | Rusher et al. |

LOAD BEARING TONNEAU COVER WITH INTEGRAL TRACK, IMPROVED LATCH TO VEHICLE AND CUSTOM FRAME ATTACHMENT

BACKGROUND

Field of the Invention

This invention relates generally to tonneau covers. Specifically, the present invention is directed to obtaining an improved load bearing tonneau cover that includes improvements by including an integral track in each section of the tonneau cover, an improved latch mechanism for attaching the tonneau cover to a vehicle, and a custom carrying frame for loading UTVs or snowmobiles on the tonneau cover.

Description of Related Art

A tonneau cover may describe a hard or soft cover used to protect unoccupied passenger seats in a convertible or roadster, or the cargo bed in a pickup truck. Hard tonneau covers may open by a hinging or folding mechanism while soft covers may open by rolling up.

A tonneau cover may be used to conceal cargo or protect cargo from the elements. When the tonneau cover is used, it may keep cargo out of the sun and provides extra security by keeping items out of sight.

Tonneau covers have been well documented in publications since their inception in the early 1900s as a means to cover or conceal cargo in a vehicle. Even though vehicles have evolved in design and function over the years, the design of marketable tonneau covers may have only evolved in terms of aesthetics rather than increased practical functionality.

The largest market for tonneau covers may be the pickup truck. It has been estimated that 98% of the tonneau covers made for this market serve the singular function of covering the cargo bed to compliment the look of the vehicle.

One style of tonneau cover is the soft cover. The soft tonneau cover may generally be made from fabrics or fabric composites that resist water and UV light damage. This may be the most common cover because of its low cost. This style may be made to retract or roll up or back into position. The soft tonneau cover may occupy the least amount of space and there are a variety of attachment and fastening methods that are employed to attach it to a pickup truck.

A second style of tonneau cover is the hard cover. The hard cover is typically made from fiberglass, hard plastic, rubber, aluminum or some combination of these or other materials. The tonneau covers made from fiberglass may be described as a single shell type cover that opens by a hinge at the cab portion of the bed. Because they are quite heavy they may include pneumatically assisted cylinders for opening and closing. The hard tonneau covers are often made to order so that their color matches the color of the truck.

A variation of the hard tonneau cover is one that utilizes a series of foldable sections to cover the cargo portion of the bed. These sections can fold together from the rear to the front of the truck and stack near the cab to make use of the cargo portion of the truck bed. A variation of this design is to have a foldable section that opens from the side of the truck bed. The hard tonneau covers may either have locks located in the foldable panels or open from the inside of the bed. Typically, the covers that open from the inside of the bed rely on the factory locking tailgate to secure the bed contents. The hard tonneau cover is the next cost increment to not only cover the contents of the truck bed but to secure them as well with a lock system so that valuable items can be safely kept in the truck bed.

Both hard and soft tonneau covers may have a profile as low as possible with the top edge of the truck bed sides and tailgate for improved aesthetics. As a result, additional hardware may be needed to mount the tonneau cover to the inside walls of the truck bed.

One style of hard tonneau cover, fabricated from aluminum, has been developed to carry a load on the top while leaving the bed under the cover to carry additional items. This cover opens in a gull-wing manner with hinges secured across the middle of the truck bed allowing aluminum sections to open in the front behind the truck cab and at the tailgate. The utility is further increased by using boat style cleats for cargo tie downs. This style of tonneau cover is locked from the top of the cover and may have a protruding handle lock.

It is important to note that tonneau covers are aftermarket purchases that may need to be aesthetically pleasing to attract customers. Also, the owner may resist modifying a vehicle by making permanent changes such as drilling into the body or bed for attachment points.

There are some problems with existing tonneau covers. The soft tonneau covers may be limited to a covering function and cannot effectively be used for supporting objects. These tonneau covers may only protect the contents of the truck bed from weather. They may require multiple fasteners to be installed on the truck bed. It is a problem for many vehicle owners to drill holes in their vehicle for mounting these fasteners. In the event that it is desired to remove the cover altogether, the vehicle is left with exposed fasteners or if the fasteners are removed, permanent holes in the vehicle.

The single section hard tonneau cover, such as those made of fiberglass, may also require hardware mounted to the bed itself. This hardware may include hinges near the cab, gas struts on the sides and some sort of locking mechanism on the tailgate. In most cases, they are special ordered to be painted the color of the truck and a professional installer may need to be used for the installation.

There are several problems with this hard tonneau cover system. For example, the single section may only be opened as far as the gas struts allow. This means that nothing higher than the bed rails (if the cover is closed) could be put in the cargo section of the bed unless the hard tonneau cover itself is removed. If the hard tonneau cover is removed, it typically requires 2 people to undo hardware and lift the cover from the truck. This additional cost along with the yearly change in bed sizes for new truck models may make this a difficult and costly manufacturing/supply process.

Another problem with this hard tonneau cover design is the use of screws to attach hardware to the truck bed. A truck may experience extreme vibration during work and recreational use, especially if it is driven off road. Over a short amount of time, the thin sheet metal surrounding the screws may have a tendency to wear, deform and enlarge leaving a heavy tonneau cover improperly secured to the vehicle.

Hard tonneau covers with folding sections may add the element of utility by folding back and allowing objects taller than the sides of the bed to be transported in the bed without removing the hard tonneau cover. Unfortunately, most of the designs for hard tonneau covers have a significant number of parts required for construction to achieve this design objective. This construction may include rails that must be attached to the inside of the bed rails and each foldable section must fit uniformly and rest on these rails.

If the inside measurement across the width of the truck bed at the tailgate is 2 to 4 inches less than the inside measurement taken across the bed at the cab (both measurements taken at rail height) as in many trucks, each folding section may need to be trapezoidal in shape for proper fit up with the bed rails. This taper varies with make, model and year, and is a tremendous difficulty and expense for manufacturers to deal with for the multitude of trapezoidal shaped folding sections.

The problem may often be managed by offshore sourcing of materials to reduce cost and followed by domestic assembly of the components. Offshore sourcing is becoming more problematic because of long lead times, higher shipping costs, and higher component costs as world manufacturing costs merge closer together. Also, the uncertainty of foreign suppliers and their respective governments, means that domestic manufacturers must bear the risk of higher inventories, and consequently, higher costs. Further, costs may be incurred as a result of obsolete products which cannot be dumped in the market place without affecting existing price levels.

For the additional cost, these folding hard tonneau covers have only added a single dimension of utility by increasing cargo bed utilization. It is unfortunate that much of the cost and effort that goes into the design and fabrication of a folding hard tonneau cover may not provide additional utility. For example, the hard tonneau cover may not be able to carry loads or objects on top without being damaged. Many hard tonneau cover designs do not allow for any load whatsoever on top and therefore do not have attachment points to carry a load. In addition, the inherent design of the hard tonneau cover may not allow any load on the top surface because of small rails that are designed only to bear the weight of the tonneau cover and not the additional cargo load.

A pickup truck bed utility might be increased if additional items or cargo could be placed on top of the hard tonneau cover and secured while maintaining aesthetics of the cover.

One prior art design tried to provide this functionality by using aluminum tread plate sheet as a top layer with square tubing welded to the underside. This design has several design problems. First, the design prevents tall bed cargo utility by allowing only a small portion of the bed to be accessible to carrying tall cargo. Second, this tonneau cover is secured in the middle section of the truck bed by connecting the truck rails directly over the wheel wells. Hinges connect a front cab facing section and rear tailgate facing section aluminum structure which partially open with gas strut assistance. This design prevents the use for cargo taller than the bed rail to be placed in the truck bed. The struts can be disconnected on one side to somewhat increase the payload capacity, however securing the payload with tie downs is severely limited. Third, the tie down method employed utilizes a series of cleats that extend above the surface around the periphery of the cover. These cleats are prone to breakage during loading and unloading and are aesthetically undesirable. Fourth, the aluminum is conventional welded throughout the entire construction of the hard tonneau cover. These welds may cause distortion, may cause solidification defects, may be a starting point for corrosion, and may be a starting locations for crack initiation—especially when the tonneau cover is under load. Fifth, conventional hinges are mechanically attached to the folding sections and may be prone to loosening. The locations may also be locations for water entry and don't protect cargo under the cover from the weather. Sixth, there are latches on the top surface that lock the cover to the truck. These latches also protrude above the surface of the hard tonneau cover and prevent loads from being slid on and off of the surface of the cover. Seventh, because this load carrying design does not allow access to much of the bed, it may need to be removed to allow the use of hitching a goose neck trailer (used for cargo, livestock hauling, etc.) and 5th wheel trailers used for recreation.

Another matter that must be discussed is a latching mechanism that needs to be used to prevent the embodiments of the invention from moving during braking or acceleration of a vehicle. It seems that there are an infinite number of latch styles and types for many applications. They range from typical door latches used in homes to specialty latches found in the automotive and aerospace applications. The majority of these applications utilize latches that restrict one degree of freedom of each side of a hinged device. Simply stated, they are used to keep two components on a hinge from opening. The next most common hinge restricts 2 degrees of freedom and is used to maintain the closure of 2 components but resists lateral sliding along the hinge axis. The most common of these latches is a buckle latch. Buckle latches are common to travel trunks that need to resist the top and bottom sections from sliding apart at the closure plane. These latches are used when the hinge is not rigid enough to prevent an extra degree of freedom.

It is interesting to note that assembly engineering design convention typically utilizes latches that resist one degree of freedom for the use of the assembly. In other words, hinges are designed to resist load conditions except for the movement of opening and closing said hinged components. This latch style resists one degree of freedom, the motion to open the hinged components. There are many design opportunities where the hinge is compliant and cannot resist all of the degrees of freedom of the hinged assembly. One example of this case is the load bearing foldable tonneau cover. Compliant hinges may be used to join at least 2 load bearing sections of this foldable tonneau cover. Since the hinges are compliant, the forces of the load secured to the top of the cover and the tonneau cover itself must be reacted against the truck bed in some fashion. This latch system must react 3 degrees of freedom—1. The force to lift the cover upwards, 2. The force to prevent the cover and load from sliding forwards when the truck brakes are suddenly applied, and 3. The force applied when the truck quickly accelerates. Each section of the tonneau cover that has an attached load must be able to react the forces to the bed of the truck. In addition, the latch system must be low profile and still allow each cover to fold on itself.

There are many other examples of assemblies and compliantly hinged components that could benefit from a latch solution that would eliminate at least 2 degrees of freedom.

Another issue that arises with tonneau covers may be an affordable attachment system for securing loads to the top of the tonneau cover. For example, when it is desirable to attach a load, a D ring may be used. The D ring attachment method may be unique and integral to a heavy duty design. The D ring may rely on a formed tread plate extended over an edge extrusion to contain and cover the D ring as well as reacting tie down loads as shown in FIGS. 6 and 7. However, an alternative to the D ring design may be desirable when a lower cost alternative is needed. Accordingly, a lower cost alternative to a D ring would also be an improvement over the prior art.

Another issue that may arise is the desire to haul items that are larger or may be longer than the bed of a pickup truck. For example, an owner may wish to transport a side-by-side recreational vehicle (UTV) or a snowmobile.

These vehicles are typically longer than the bed of the pickup truck and may require the use of a very large and custom-built frame that is mounted to a pickup truck. The custom-built frame is expensive and may prevent access to or use of a pickup bed. Alternatively, the owner may pull down a tailgate so that the vehicle can sit in the bed and hang over the back end of the tailgate. This option may prevent the owner from using the pick-up bed for hauling other items.

It would be an improvement over the prior art to provide a tonneau cover that can accommodate a large vehicle that may hang over the end of the pick-up truck and still allow use of the pick-up bed for carrying other items.

It is to be understood that the following description is only exemplary of the principles of the present invention, and should not be viewed as narrowing the claims which follow.

BRIEF SUMMARY

The present invention is a system and method for providing a folding load bearing hard tonneau cover, wherein each folding section is constructed using friction stir welds for strength, stiffness and visual appeal, wherein edge extrusions may include an integral attachment track which is capable of sustaining high tie down loads, wherein a spring loaded latching system has the strength to react the moments generated by heavy loads on top of the tonneau cover, wherein installation does not require modification to the bed but instead uses a 2 bolt attachment system, and wherein the tonneau cover may carry heavy loads on top that are easy to secure, and wherein a custom carrying frame is easily attachable to the tonneau cover to enable large and heavy loads, even some that are longer than the pick-up bed, to be carried on the tonneau cover while enabling use of the pick-up bed for other cargo.

These and other embodiments of the present invention will become apparent to those skilled in the art from a consideration of the following detailed description taken in combination with the accompanying drawings.

DETAILED DESCRIPTION

Reference will now be made to the drawings in which the various embodiments of the present invention will be given numerical designations and in which the embodiments will be discussed so as to enable one skilled in the art to make and use the invention. It is to be understood that the following description illustrates embodiments of the present invention, and should not be viewed as narrowing the claims which follow.

Figure 1:
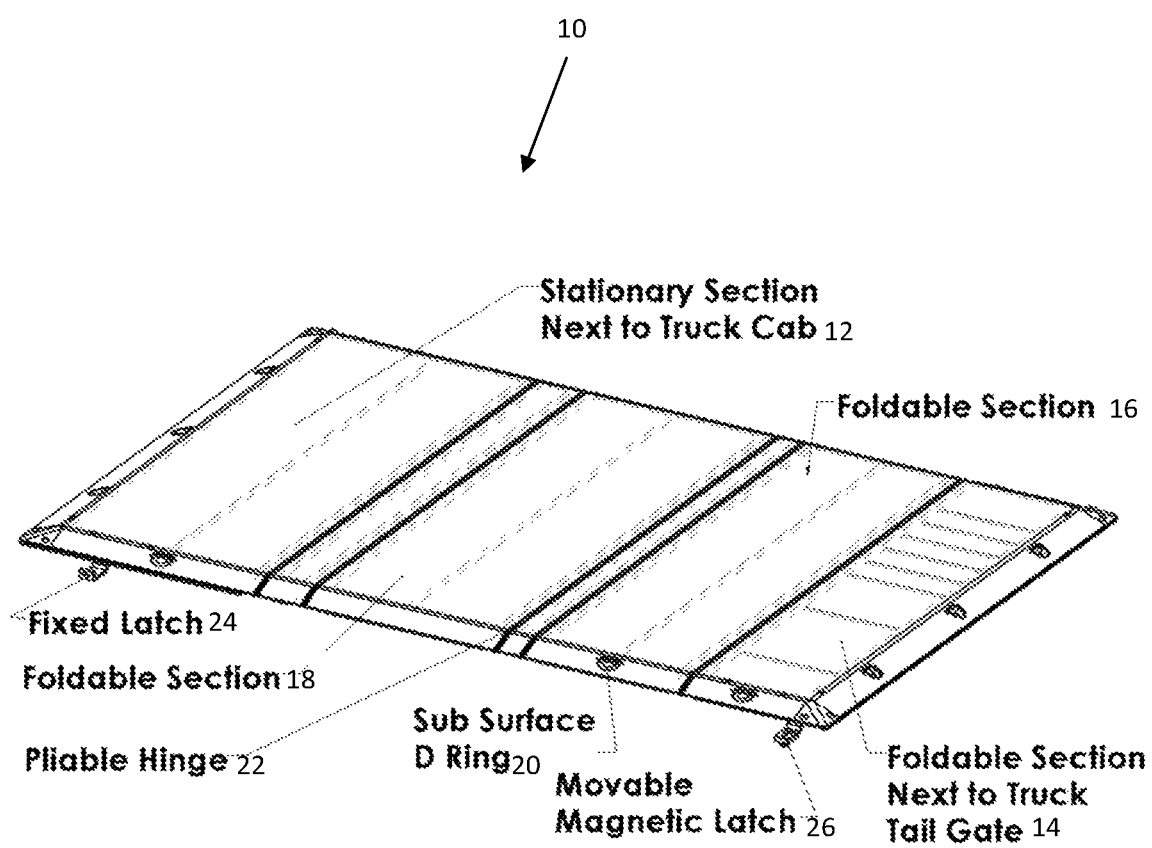
FIG. 1 is a perspective view of the overall design and layout of the tonneau cover of the first embodiment.

A first embodiment of the present invention is shown in FIG. 1. This first embodiment may incorporate elements required to support heavy loads even up to the pickup truck load carrying capacity, fold to the cab of the truck to allow for tall objects in the bed of the truck, fold to the cab to allow the attachment of goose neck and 5th wheel hitches without removing the tonneau structure from the truck, have no protruding handles, hinges, cleats or tie downs to be aesthetically pleasing to the eye, have below surface attachment locations in thick cross section elements on the exterior and interior for attaching accessories to meet specialty customer needs according to their preference, have no bolts or traditional fasteners for its construction, have no conventional welds (Tig, Mig, or other conventional welding methods), not require modification to the vehicle for attachment with holes or screws, be easily removable, have a unique hinge design that is durable and weather resistant, allow for internal storage of frequently used items which include but are not limited to a tow strap, jumper cables, tie down straps, gloves, flashlight, etc., have removable sections that can adjust the length of the tonneau structure to accommodate tool boxes, external fuel tanks, etc., and have a unique magnetic latching system that allows for quick and easy opening, closing and locking the tonneau structure.

A diagram of this tonneau cover of the first embodiment is shown in FIG. 1. This tonneau cover 10 is a hard structure and may rest on top of the bed rails of a pickup truck (not shown). The load bearing capability of the tonneau cover may come from the unique method of combining structural components on the underside of the load bearing tonneau cover 10 surface. Features and components may include a stationary section next to the truck cab 12, a foldable section next to the truck tailgate 14, a foldable section 16, another foldable section 18, a plurality of subsurface D rings 20, pliable hinges 22 between each section 12, 14, 16, 18 of the tonneau cover 10, a fixed latch 24 for securing the non-folding section 12 to the truck bed, and a movable magnetic latch 26 for securing one or more foldable sections 14, 16, 18 to the truck bed.

Figure 2:
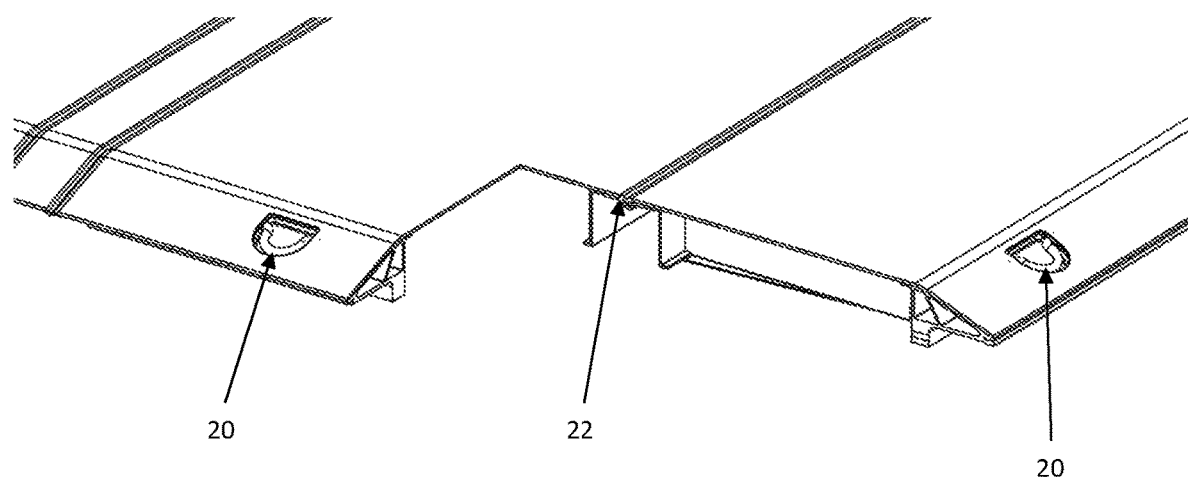
FIG. 2 is a perspective view of joint locations that may be joined using solid state joining techniques of friction stir welding.

FIG. 2 shows a cross sectional view of the tonneau cover 10 to illustrate the joining process. This figure illustrates two subsurface D rings 20 and a cross section of a pliable hinge 22.

Figure 3:
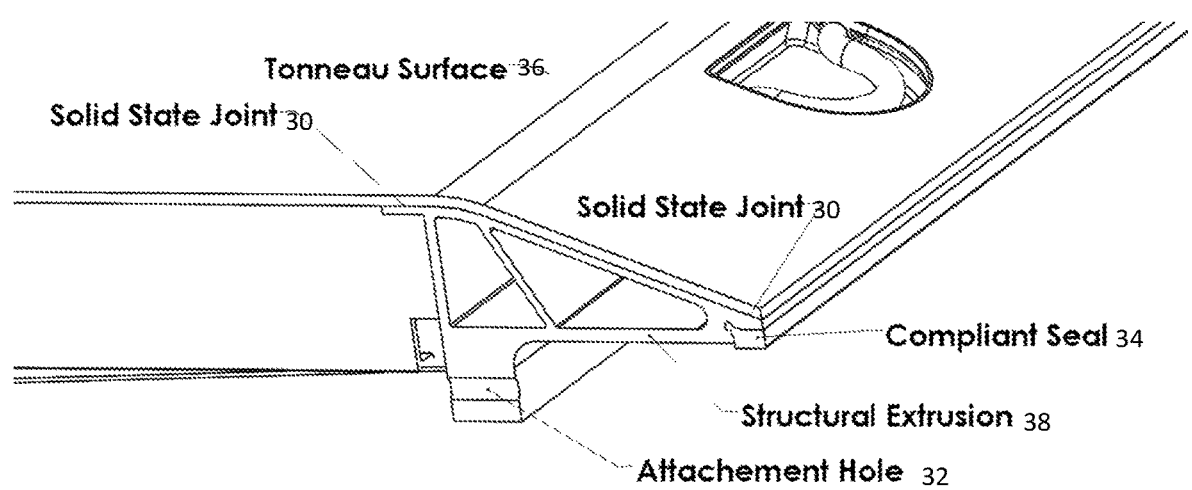
FIG. 3 is a perspective view of edge joint configuration showing locations of solid state joints of the first embodiment.

FIG. 3 also shows a close-up cross sectional view of an edge of the tonneau cover 10 that illustrates the locations of solid state joints 30. This figure also illustrates a cross section of an attachment hole through the tonneau cover 10, a compliant seal 34 which is pressed against the truck bed, the surface 36 of the tonneau cover, and a portion of the structural extrusion 38 of the edge of the tonneau cover.

In order for a tonneau cover 10 to be durable as it serves as a utility surface, the first embodiment may eliminate mechanical fasteners such as screws, rivets, crimped interlocks, and other common devises that often form the integral structure of prior art tonneau covers. These fasteners may be acceptable for large or thick cross sections; however, they tend to be failure points for thin cross sections that exist in the tonneau cover 10 of the first embodiment.

Other joining methods such as conventional weld methods which require the melting and subsequent freezing of materials to form a joint are also eliminated with this construction method of the first embodiment. A solid state joining method may include but not be limited to a combination of friction stir joining, friction stir spot joining, friction stir processing, linear friction joining, etc. and are referred to hereinafter collectively as friction stir welding. The friction stir welding may be used at all appropriate joint locations such as those shown in FIGS. 1, 2 and 3.

Using friction stir welding to create the solid state joints 30 of the tonneau cover 10 may be advantageous because the tonneau cover may be constructed as a continuous skeletal structure without the disadvantages of a structure that is welded using conventional welding techniques. Using friction stir welding may eliminate the problems of conventional joints that become stress raisers that lead to component failure. Friction stir welding of joints may be an essential element of the first embodiment in order to resist the extreme environment of high loads, vibration and impact which is considered normal use for pickup trucks and off road vehicles.

Figure 4:
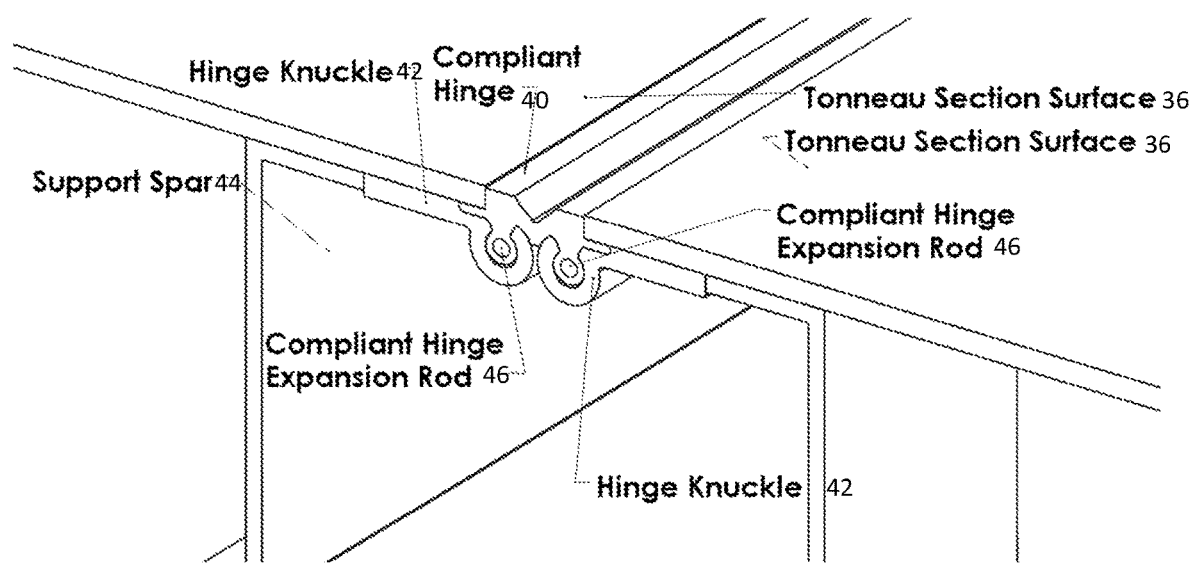
FIG. 4 is a perspective view of a method of joining sections together using a compliant hinge and expansion rod of the first embodiment.

FIG. 4 shows a second aspect of the first embodiment which is a means used to connect folding sections 14, 16, 18 together, an example of which is illustrated. The first embodiment may use a compliant hinge 40, such as rubber or a rubber-like material, which may be inserted into a hinge knuckle 42 on each adjoining section 12, 14, 16, 18 of the tonneau cover 10. The hinge knuckle 42 may be joined in a solid state method to not only the surface 36 of the tonneau cover 10 but to a support spar 44. The compliant hinge 40 may be inserted into each hinge knuckle 42 followed by an expansion rod 46 that is inserted through the center of the compliant hinge 40 shown in FIG. 4. This forms a high strength sealed joint that may be waterproof. The expansion rod 46 may be easily removed to replace a section 12, 14, 16, 18 of the tonneau cover 10 or to change a configuration of tonneau sections.

Figure 5:
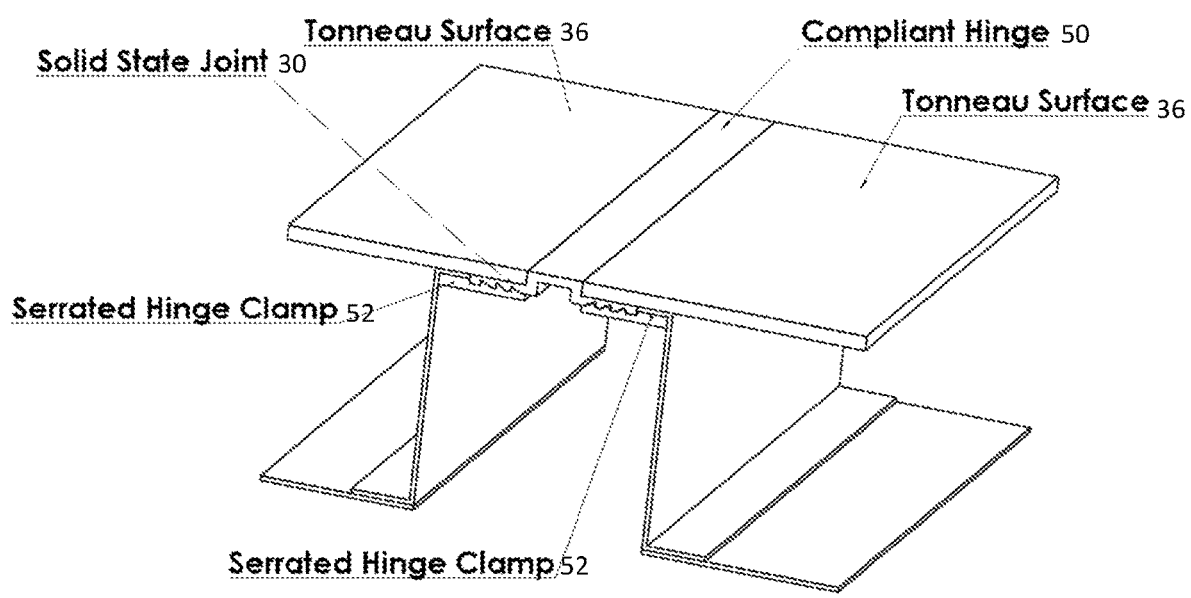
FIG. 5 is a perspective view of method of joining sections together using a compliant hinge and expansion rod of a second embodiment.

FIG. 5 shows an alternate method for joining tonneau sections 12, 14, 16, 18 together with a serrated compliant hinge 50 in a second embodiment of the invention. FIG. 5 may use a serrated configuration of the serrated compliant hinge 50. This configuration may include serrated hinge clamps 52 that grip the serrated compliant hinge 50 as shown.

Figure 6:
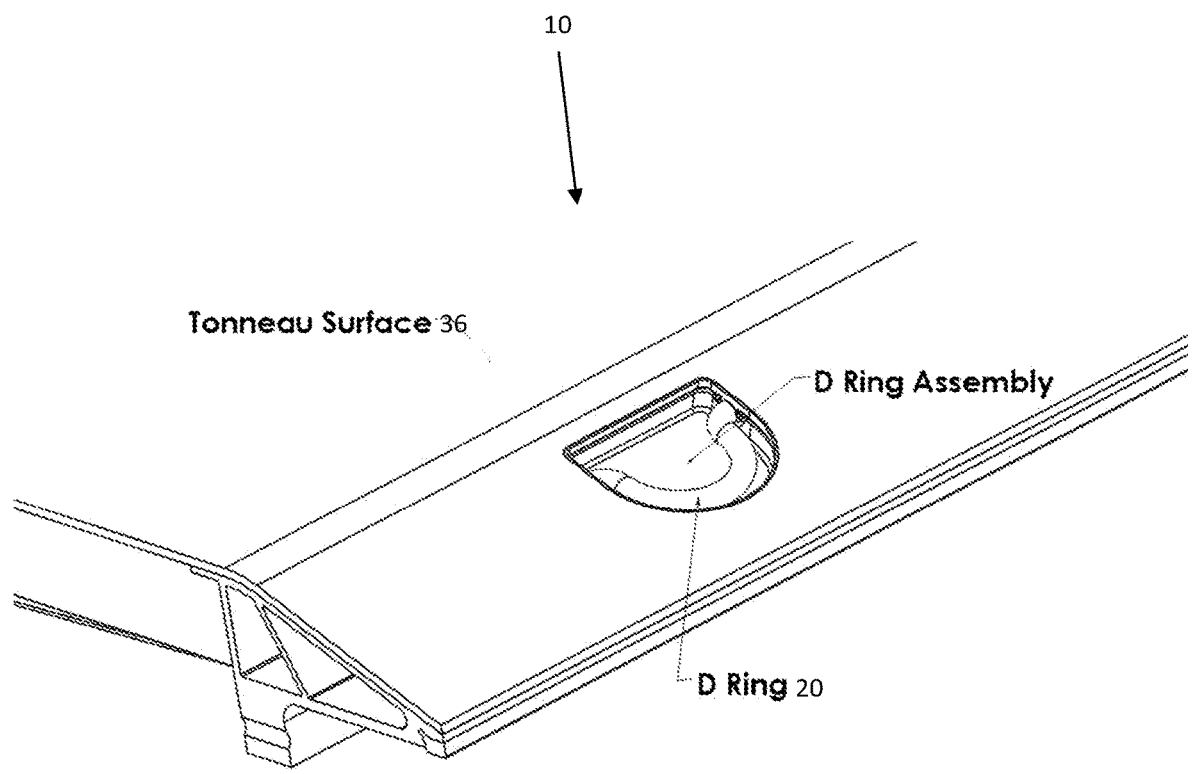
FIG. 6 is a perspective view of a D ring assembly for load attachment of the first embodiment.

FIG. 6 illustrates another aspect of the first embodiment of the invention which is a means to attach loads to the surface 36 of the tonneau cover 10. Specifically, the first embodiment uses a low profile D ring 20 and its assembly that is both aesthetically pleasing and functional.

Figure 7:
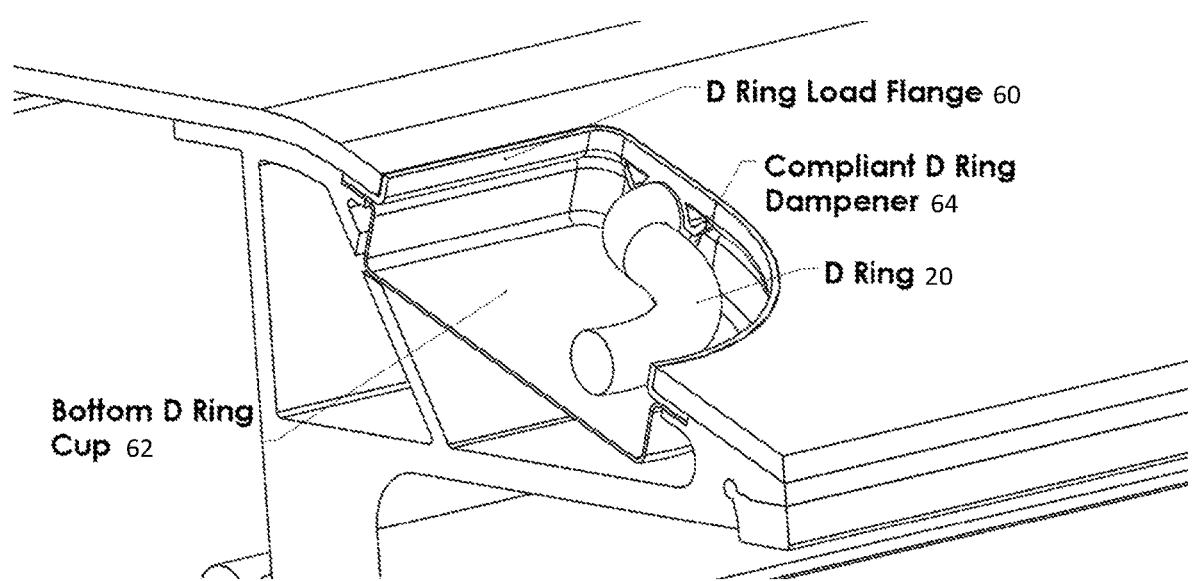
FIG. 7 is a close-up perspective view of the D ring of FIG. 6 of the first embodiment.

FIG. 7 is a close up and cut-away illustration of the D ring 20 and its assembly of FIG. 6. Rather than using the typical screw or bolt to fasten and carry the load of a D ring assembly, the first embodiment may use a D ring load flange 60 which may be inserted into a "D" shaped profile from the underside of the surface 36 of the tonneau cover 10 prior to solid state joining the surface to a tonneau edge structure. This D ring load flange 60 may be a high strength material having a large surface area and may be able to resist high loads. A bottom D ring cup 62 may be inserted underneath the D ring load flange 60 not only for aesthetics, but may also keep weather from entering the internal portions of the edge support. The D ring assembly may also include a compliant D ring dampener 64.

Figure 8:
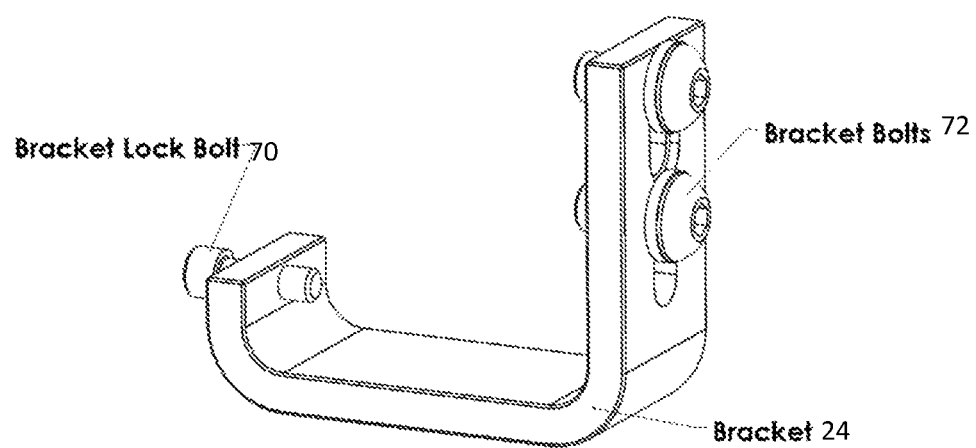
FIG. 8 is a perspective view of a fixed J bracket for securing the tonneau cover to truck bed rails of the first embodiment.
Figure 9:
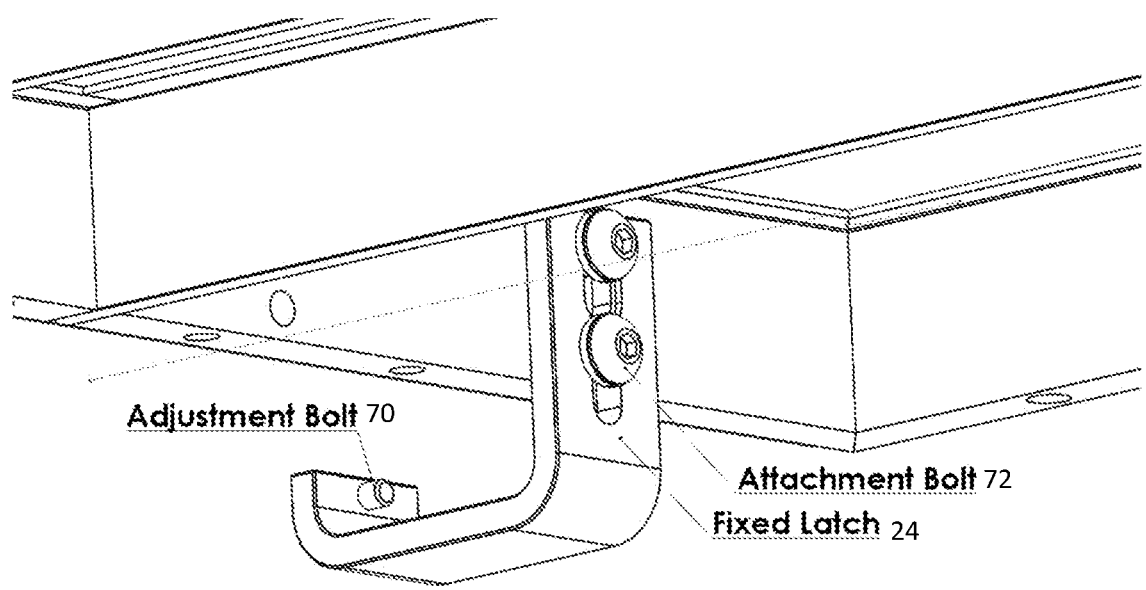
FIG. 9 is a perspective view of the fixed J bracket of the first embodiment for securing the tonneau cover to the thick section of truck bed rails.

Another important aspect of the first embodiment of the invention may be the ability to easily attach the tonneau cover 10 to the pickup truck bed rail without modifying the bed with holes and screws while capable of reacting loads attached to the surface 36 of the tonneau cover 10. The tonneau cover 10 should easily unlock, open, unfold, fold back and lock. FIGS. 8 and 9 illustrate a J clamp 24 that may be attached to any thick section attachment location under the tonneau cover 10 to secure the tonneau cover under the edge rails of the truck. This J clamp 24 may be used to secure the tonneau cover 10 section 12 near the cab to a truck bed rail.

FIG. 8 is a perspective view of a fixed J bracket 24 that may be used to secure the tonneau cover 10 to the truck bed rails, and may include a bracket lock bolt 70 and bracket bolts 72.

FIG. 9 is a perspective view showing the fixed J latch 24 attached to the thick section on the underside of the tonneau cover 10.

The first embodiment of the invention may utilize a movable magnetic clamp 26 design that may also be attached to various thick section locations under the tonneau cover 10 for quick securing and un-securing of the section 14, 16, 18 of the tonneau cover that is being opened or closed.

Figure 10:
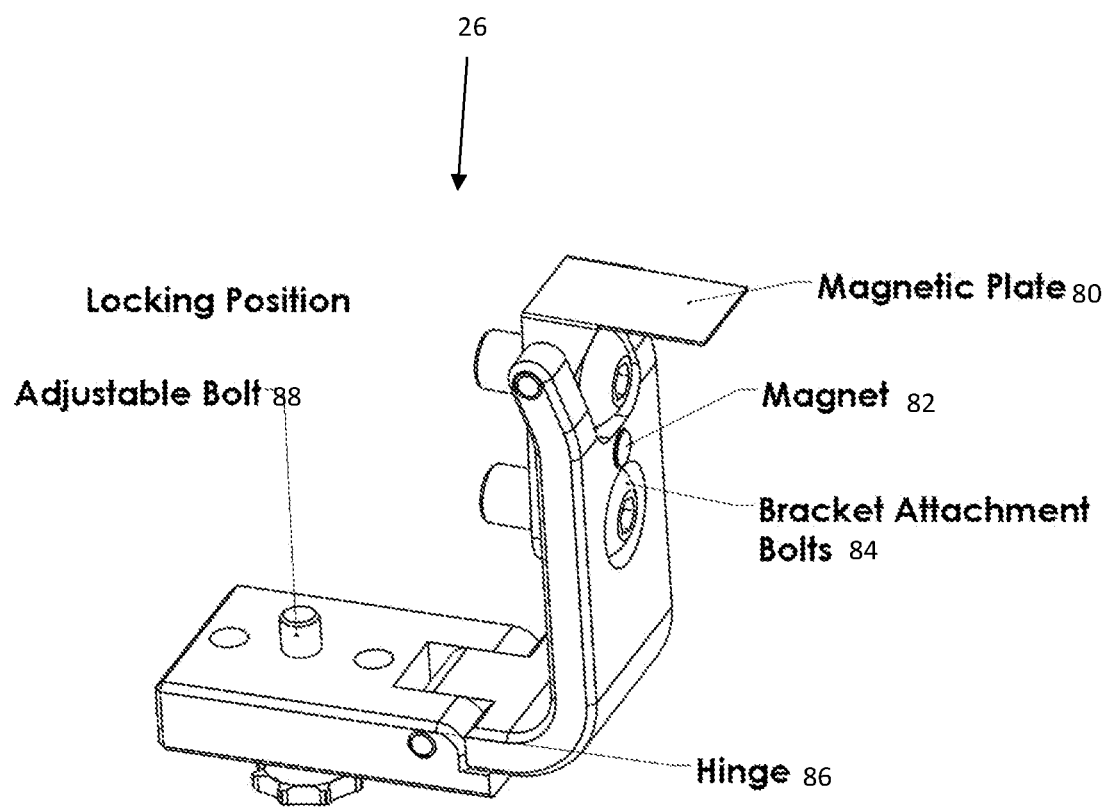
FIG. 10 is a perspective view of a moveable locking bracket of the first embodiment shown in a locking position.

FIG. 10 is a perspective view of a moveable magnetic locking bracket 26 shown in a locking position, and may include a magnetic plate 80, a magnet 82, bracket attachment bolts 84, a first hinge 86 and an adjustable bolt 88.

Figure 11:
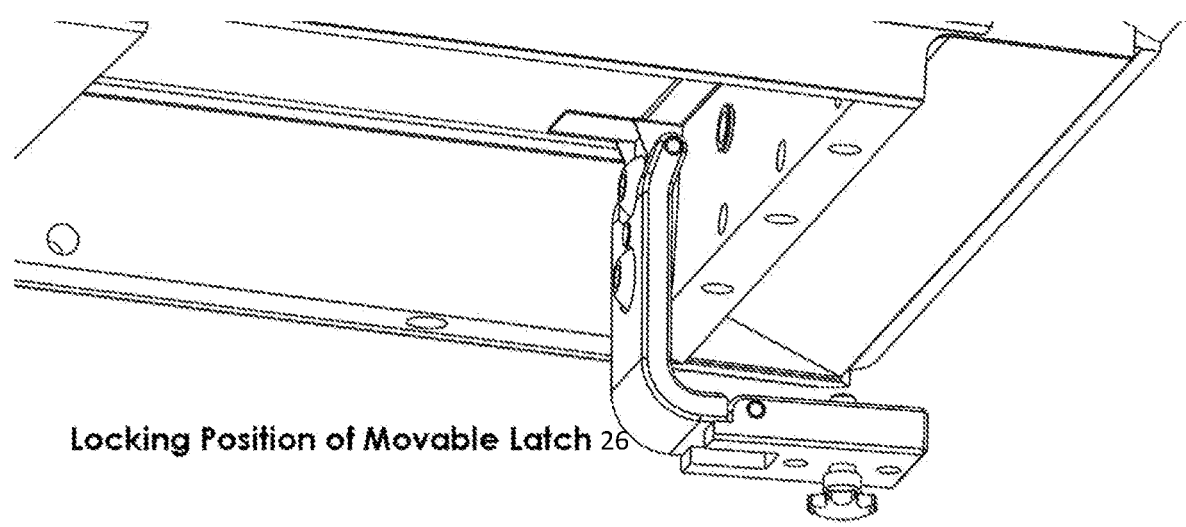
FIG. 11 is a perspective view of a moveable locking bracket of the first embodiment shown in a locking position on the underside of the tonneau cover.

FIG. 11 is a perspective view of the moveable magnetic locking bracket 26 shown in the locking position on the underside of the tonneau cover 10. This moveable magnetic locking bracket 26 may be securely bolted to the thick section of the edge structure. The moveable magnetic locking bracket 26 may be held in the locking position by a rare earth magnet 80 (shown in FIG. 12). The moveable magnetic locking bracket 26 may be conveniently moved to the open position as it pivots about the first hinge 86 near a bracket attachment point, and a second but weaker magnet 82 holds the latch open. A second hinge 90 allows the moveable magnetic locking bracket 26 to be completely folded so the tonneau cover 10 may be folded on itself without latches interfering with other sections of the tonneau cover 10. The adjustable bolt 88 is tightened to move upward and engage against the inside of the bed truck rail lip when a heavy load is secured to the top of the tonneau cover 10. This allows the loads on the surface 36 of the tonneau cover 10 to be reacted against the truck itself.

Figure 12:
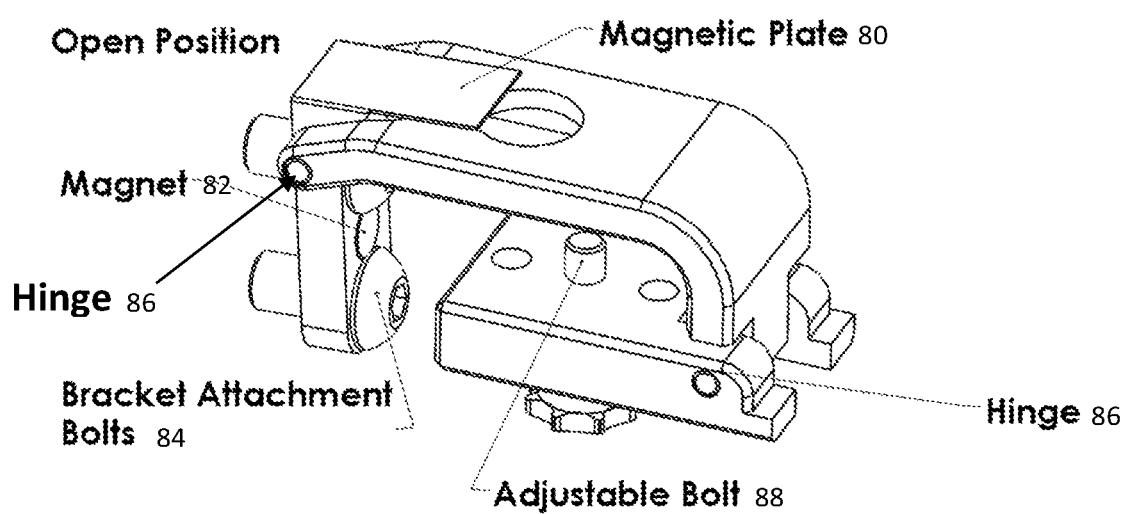
FIG. 12 is a perspective view of a moveable locking bracket of the first embodiment shown in an open position.
Figure 13:
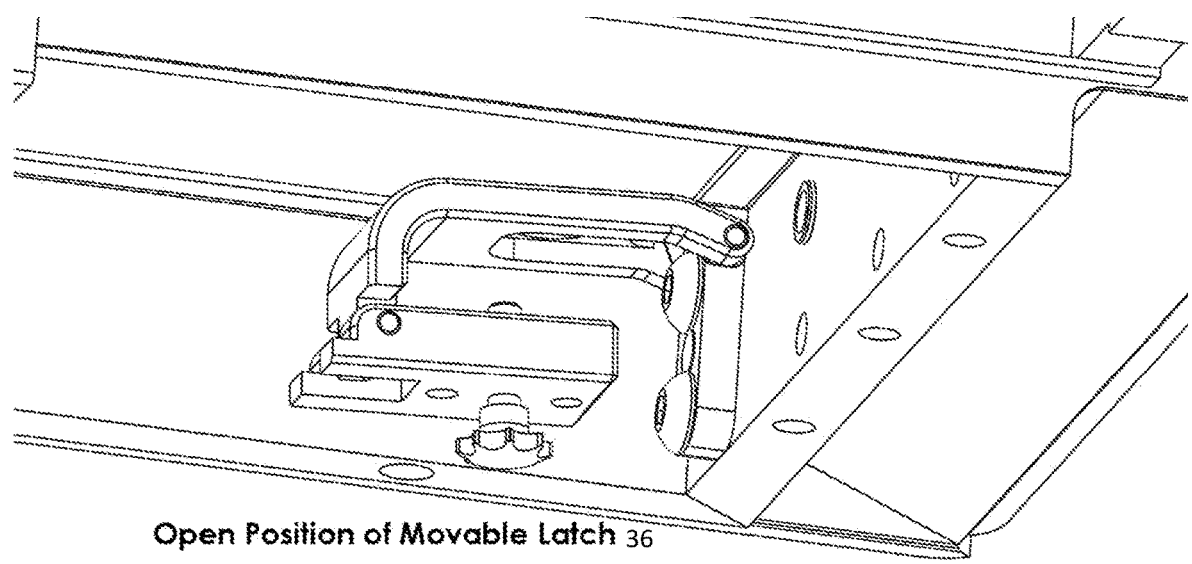
FIG. 13 is a perspective view of a moveable locking bracket of the first embodiment shown in an open position on the underside of the tonneau cover.

FIGS. 12 and 13 are perspective views that show the bracket in the open position.

The first embodiment of the present invention allows for loads to be secured on the surface 36 of the tonneau cover 10. Accordingly, there may be a need for a convenient method to store and access the necessary equipment used for securing loads. Tie down straps, tools, chains, etc. may tend to be loose in the bed of the truck or cluttering the cab because there may be no convenient method or means to access them.

Figure 14:
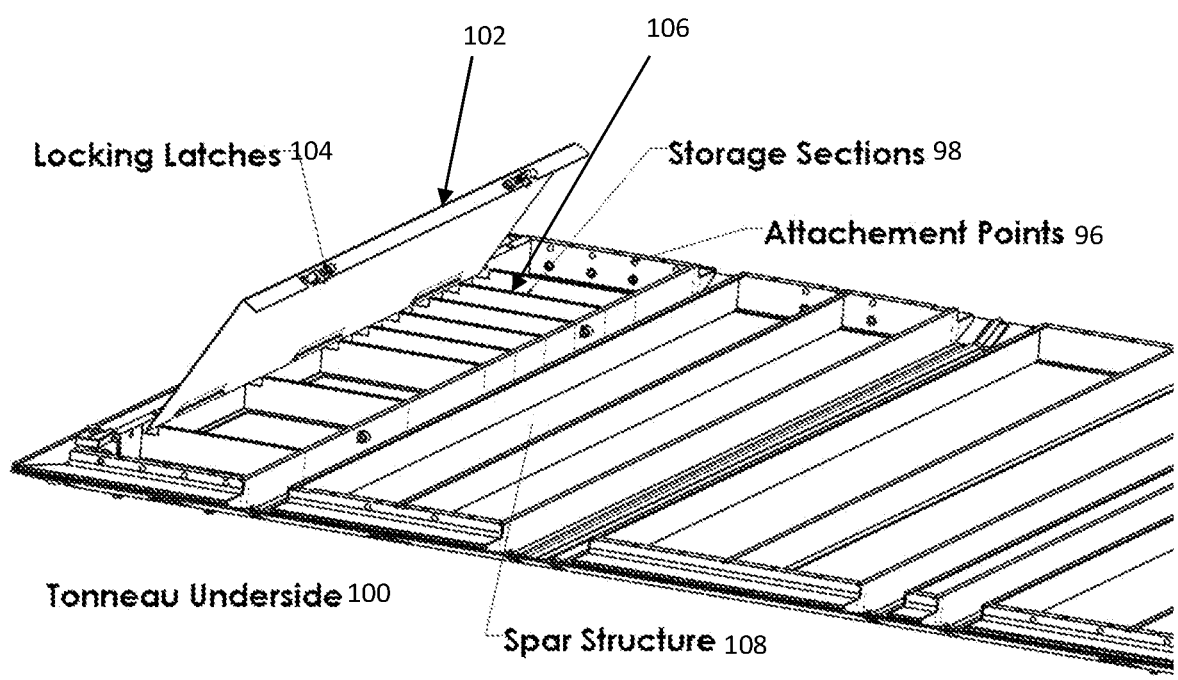
FIG. 14 is a perspective view of a tail gate section storage on underside of the tonneau cover of the first embodiment.
Figure 15:
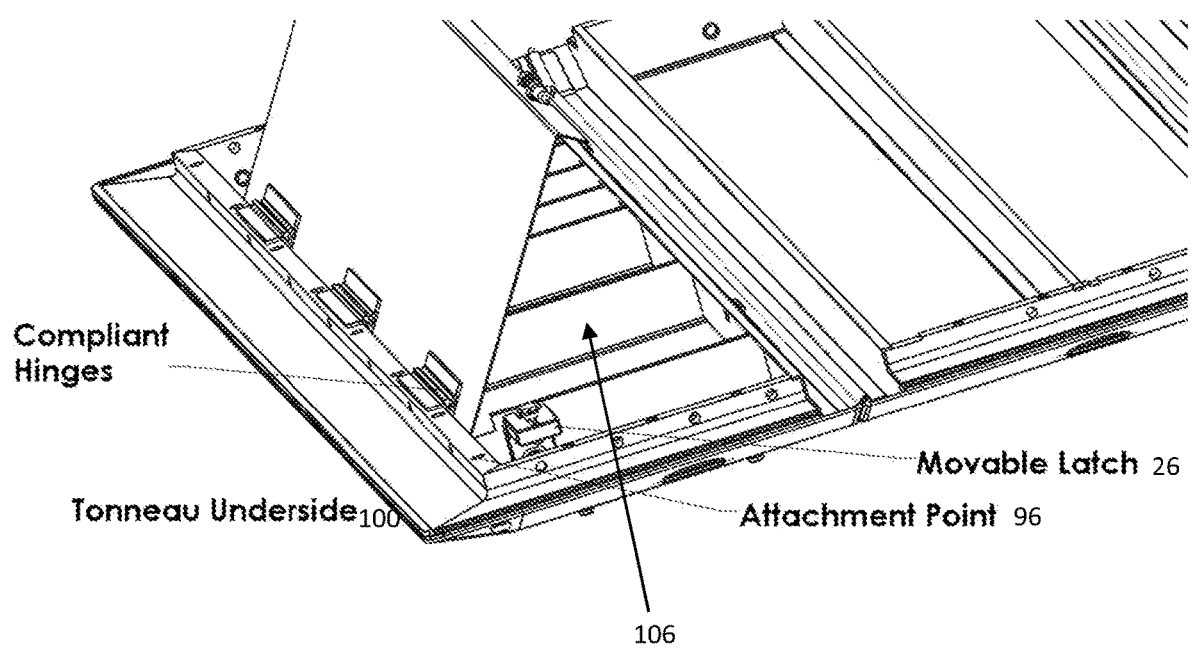
FIG. 15 is a perspective view of a tail gate section storage on underside of the tonneau cover showing the hinged lid configuration of the first embodiment.

FIGS. 14 and 15 may show a new method for storing equipment within a section of the tonneau cover 10. The hinge construction may be the same construction used to join the tonneau sections 12, 14, 16, 18 together in order to lower costs and maintain high strength standards used in the construction of the tonneau cover 10. Using the same construction methods may be important because the lid may carry the load of the items stored in the section of the tonneau cover 10 when the tonneau cover 10 is flat on the bed rails of the truck. Each section 12, 14, 16, 18 of the tonneau cover 10 may be used for storage.

FIG. 14 is a perspective view of the underside 100 of the tonneau cover 10. Each section 12, 14, 16, 18 may include a lid 102 that may be secured and opened using locking latches 104. The lid 102 may be opened when the section 14, 16, 18 is folded back to reveal a compartment 106 on the underside 100. Each compartment may have spar structures 108 that divide the compartments 106 into different storage sections 98. There may also be attachment points 96 on the walls of the compartments 106.

FIG. 15 shows additional detail of the compartments 106, including compliant hinges 94 and a moveable magnetic locking bracket 26.

Another aspect of the first embodiment for increasing the utility of this tonneau cover 10 may be the use of connection points to attach accessories such as tool boxes, winches, racks, specialty fixtures for sporting good items, etc. The problems associated with using fasteners to construct a tonneau cover 10 with existing art were identified earlier. These problems may be a result of joining thin sections of the tonneau cover 10 to other thin or thick sections. The first embodiment allows for the outer edge structure to have a thick section which allows for the mechanical attachment to other thick sections as shown in FIG. 16.

Figure 16:
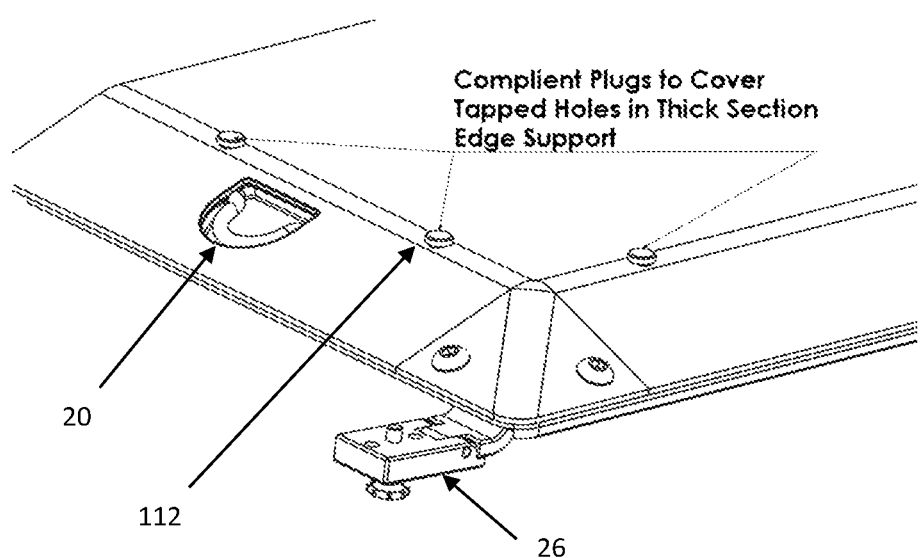
FIG. 16 is a perspective view of surface holes in the tonneau cover of the first embodiment that allow for external bolt attachment of external components.

In FIG. 16, surface holes in the tonneau cover 10 may allow for external bolt attachment of external components, with low profile compliant plugs 112 shown to maintain weatherproofing. For example, the rubber plugs 112 may be removed and an external component such as a ramp may be bolted to the surface 36 of the tonneau cover 10 so that a 4-wheeler or motorcycle may be driven or pulled to the top of the surface 36 of the tonneau cover and may be secured with tie downs to the D Rings.

In this example, the ramp may be unbolted and stored in the pickup bed. Another example would be to attach a "headache rack" to a hole pattern on the surface of the section 12 of the tonneau cover 10 that is adjacent to the cab of the truck in order to prevent surface cargo from contacting the rear window of the cab.

A plurality of different fixtures and accessories may be attached to the surface of the tonneau cover 10 for increased utility. In addition, there are several attachment points on the underside 100 of the tonneau cover 10 that may be used in the same fashion for attaching additional items.

Another aspect of the invention has been developed because of a problem that has been noticed with regards to keeping the tonneau cover 10 from moving during braking or acceleration of a vehicle. What is needed is a latch assembly that prevents unwanted movement of the tonneau cover 10.

Off-the-shelf latches are generally used in common applications and produced in large volumes so the latch component represents a small cost to the application. Specialty latches are more expensive and less common and are typically made to order. An example of a specialty latch is used to lock foldable hard tonneau covers in place on a pickup truck bed. It is common to use two opposing spring loaded pull pins that are connected together with a wire as they face opposite directions. As the wire is pulled transverse to the position of the pins, they retract towards each other and the pins release from their attachment point on the side of the truck bed. The pin is almost identical in design to the pins used to engage a door knob latch to the door jamb of the common house door. This style of latch is only used on foldable hard tonneau covers that do not carry loads.

Foldable load bearing Tonneau covers may be a means to carry heavy loads on a pickup truck while leaving space in the bed underneath the cover for storage. These tonneau covers may be unique in the sense that very heavy loads may be placed on top of the cover and attached or tied down using a D ring 20 system to secure the load to the surface 36 of the cover as disclosed above. The cover may be foldable or rather has independent load bearing panels or sections 14, 16, 18 that typically fold from the tail section towards the cab section of the truck to stack on top of each other and allow full access to the truck bed. Further, the embodiments above may teach that each of the panels or sections 14, 16, 18 is hinged with a compliant member such as rubber to allow folding and provide a water barrier. This tonneau cover 10 design is effective for attaching loads to the surface, freeing up space under the cover in the truck bed and weather proofing the bed.

Figure 17:
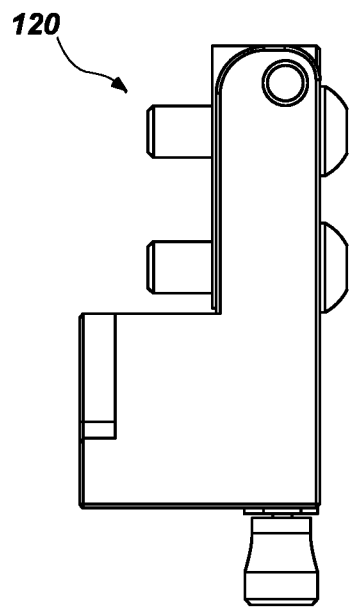
FIG. 17 shows the latch assembly in a closed position.
Figure 18:
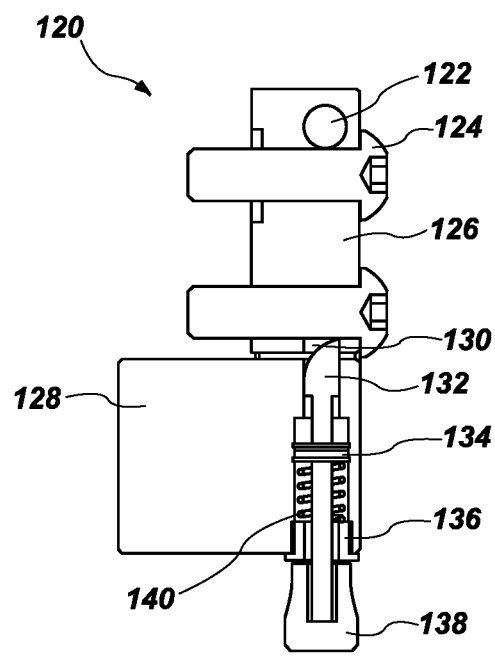
FIG. 18 shows the latch assembly in a cross-sectional view in a closed position.
Figure 19:
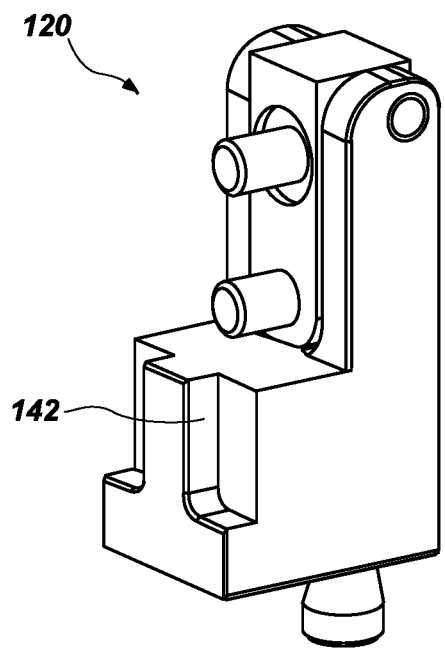
FIG. 19 shows the latch assembly in a closed position while showing load surfaces.

All of the embodiments of the invention may benefit from a novel approach to react multiple degrees of freedom in a single latch component. This shifts the need to design an assembly with a complex and expensive load bearing hinge system to react loads in multiple directions. FIGS. 17, 18 and 19 may show an entire latch assembly 120 in a closed position.

FIG. 17 shows the latch assembly 120 in a closed position.

FIG. 18 shows the latch assembly 120 in a cross-sectional view in a closed position, and illustrates a hinge pin 122, a bolt 124, a mounting block 126, a load block 128, a locking hole 130 for a pull pin, a pull pin 132, a pull pin anti-rotation sleeve 134, a spring retainer 136 a pull pin knob 138 and a spring 140.

FIG. 19 shows the latch assembly 120 in a closed position while showing load reaction surfaces 142.

Figure 20:
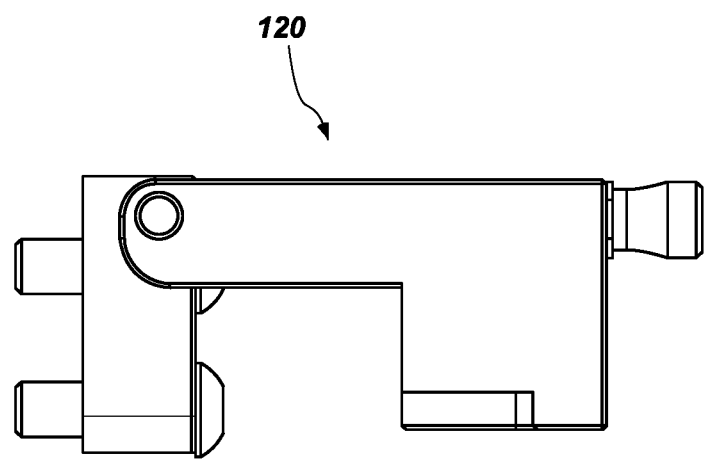
FIG. 20 shows the latch assembly in an open position.

FIG. 20 shows the latch assembly 120 in an open position.

Figure 21:
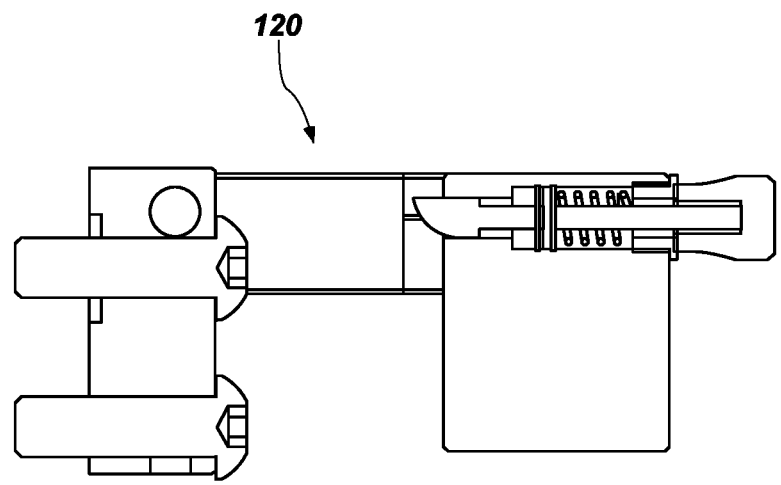
FIG. 21 shows a cross-sectional view of the latch assembly in the open position.

FIG. 21 shows a cross-sectional view of the latch assembly 120 in the open position.

Figure 22:
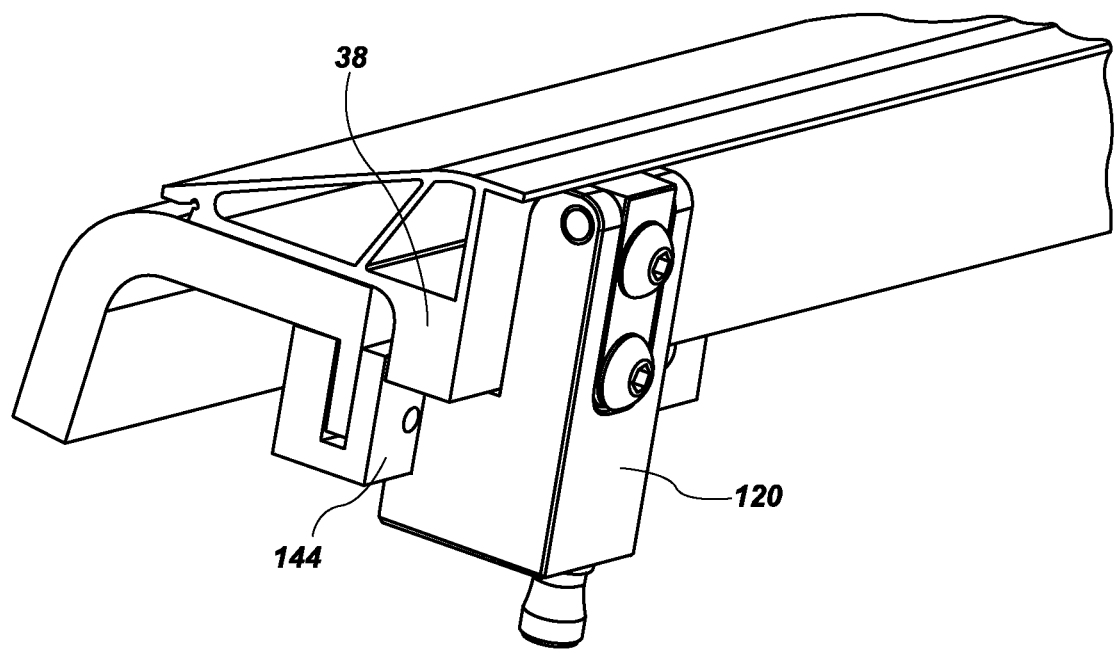
FIG. 22 shows the latch assembly attached to the tonneau cover and bed rail, with the latch assembly in the closed position.

FIG. 22 shows the latch assembly 120 with a latch receiver 144 attached to the structural edge extrusion 38 of the tonneau cover 10 and bed rail, with the latch assembly in the closed position. The latch assembly 120 shown screws into the vertical portion of the truck bed rail. No holes are required to drill into the truck.

Figure 23:
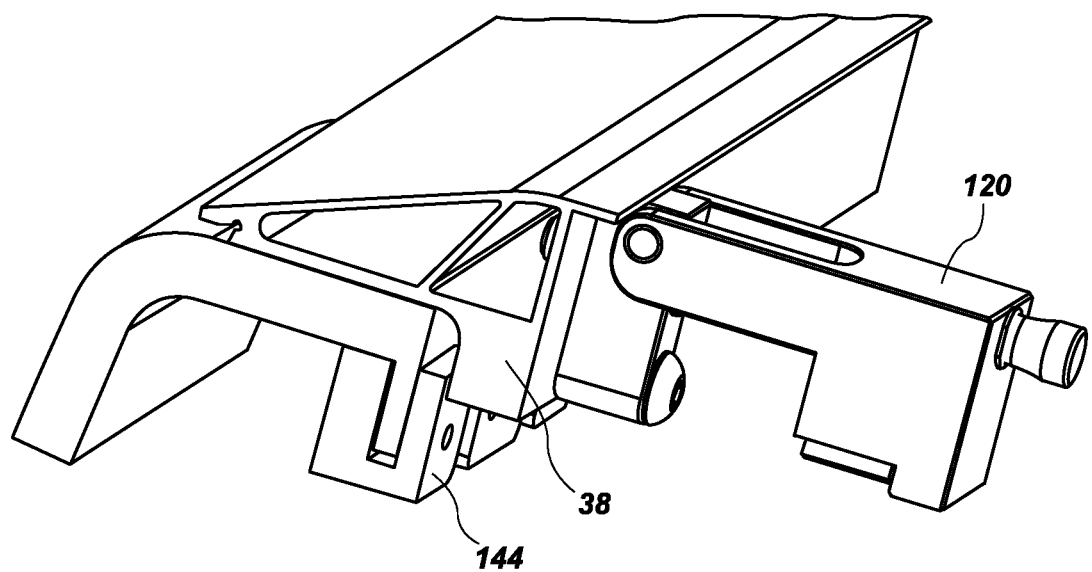
FIG. 23 shows the latch assembly on the bed rail in the open position.

FIG. 23 shows the latch assembly 120 with a latch receiver 144 attached to the structural edge extrusion 38 of the tonneau cover 10 and on the bed rail in the open position.

Figure 24:
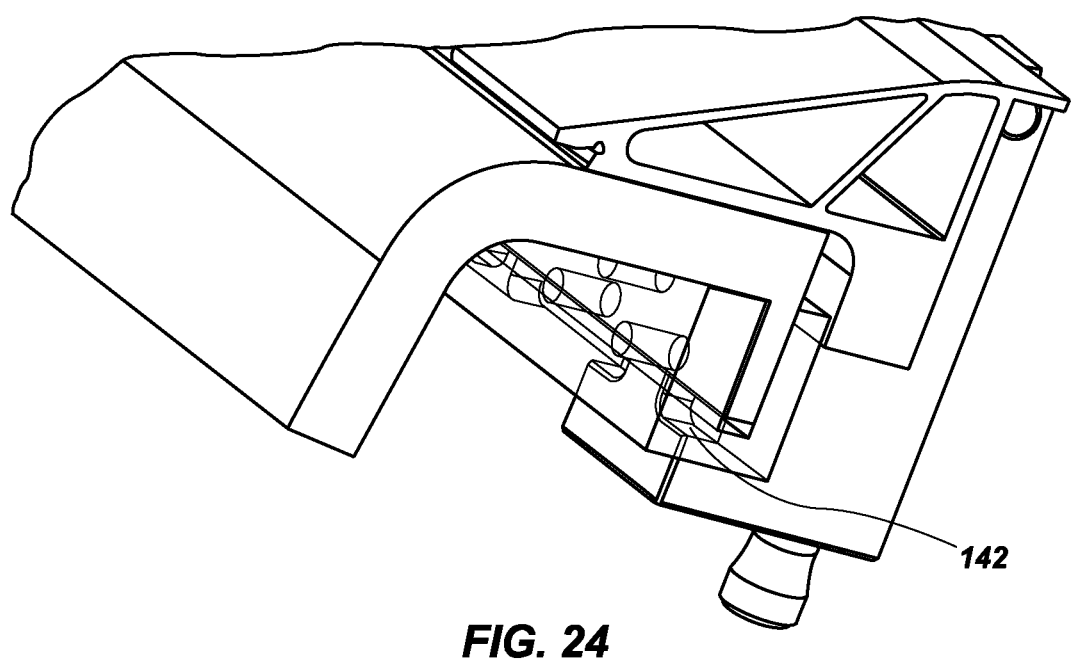
FIG. 24 shows the latch assembly loading surfaces.

FIG. 24 shows the latch assembly 120 load reaction surfaces 142.

Figure 25:
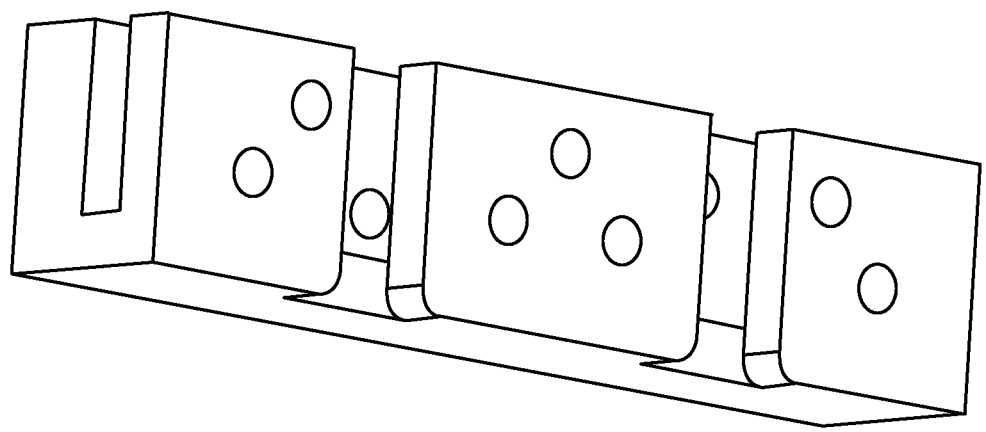
FIG. 25 shows the truck bed rail block that is attached to the bed rail using set screws.

FIG. 25 shows the truck bed rail block that is attached to the bed rail using set screws. The surfaces shown show the mating areas with the latch assembly 120 to react loads.

FIGS. 17-25 illustrate how the problems of a compliant hinge may be solved by having multiple surfaces of the latch assembly 120 reacted against the reacting surfaces of a truck bed rail block. The truck bed rail block is securely attached to the underside of the bed rail to react the loads from the tonneau cover 10 section to the truck bed rail. This is just one example of how high loads may be reacted through a latch assembly 120 and there are many applications with compliant hinges that would benefit from this invention.

Some advantages of the latch assembly 120 may include, but should not be considered as limited to, a hinged latch assembly that may restrict at least one degree of freedom in the closed position, a latch assembly with surfaces that may react loads without yielding latch material, a latch assembly having a release mechanism to open the latch, a latch assembly that may mate to a mounted block with surface to react loads, a mounting block that may not yield under load conditions, and a mounting block that may be attached using fasteners to eliminate drilling holes.

An alternative latch design is shown in FIGS. 26 to 30. This latch 150 may be a simpler design that prevents the tonneau cover 10 from moving up, down or along the bed of a truck.

Figure 26:
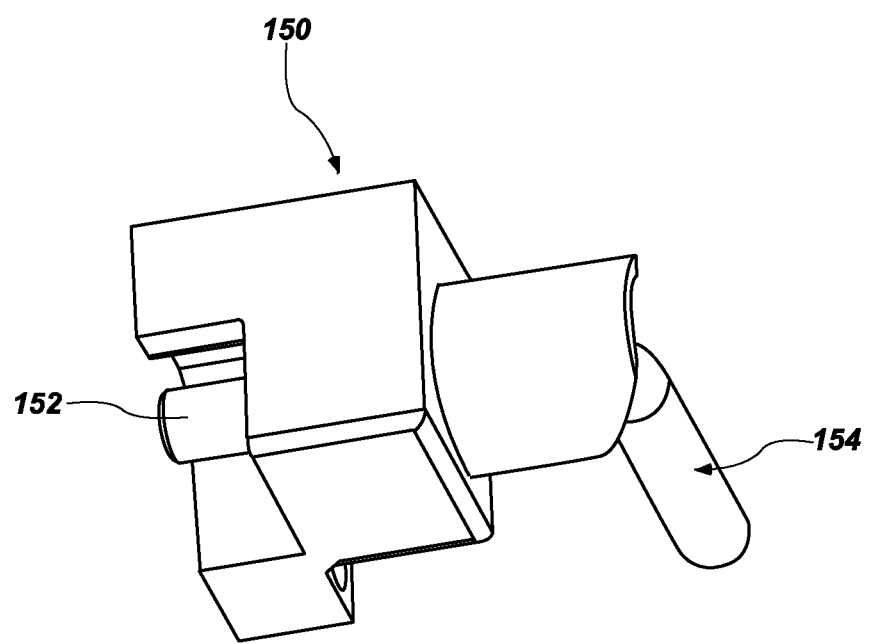
FIG. 26 is a perspective view of the latch mechanism that is bolted to the underside of the tonneau cover.

FIG. 26 is a perspective view of the latch 150 mechanism that is bolted to the underside 100 of the tonneau cover 10. The latch 150 includes a rod 152 that rotates into and out of a latch post (not shown), and a lever arm 154. The latch post is secured to the railing of the truck bed as will be shown. The rod 152 is shown in an extended and closed position, with the rod 152 extended all the way.

Figure 27:
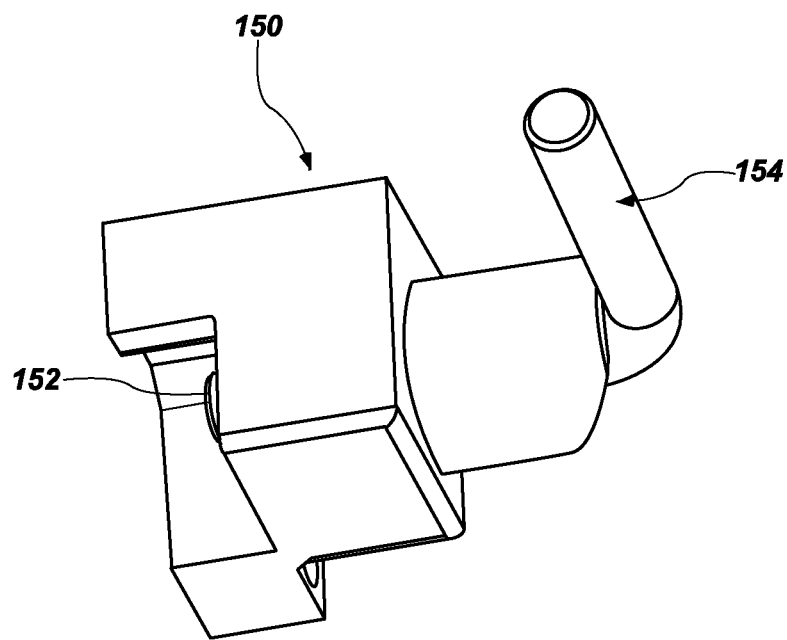
FIG. 27 is a perspective view that shows the latch where the lever arm has been rotated to thereby rotate the rod and retract the rod from the latch post.

FIG. 27 is a perspective view that shows the latch 150 where the lever arm 154 has been rotated to thereby rotate the rod 152 and retract the rod from the latch post.

Figure 28:
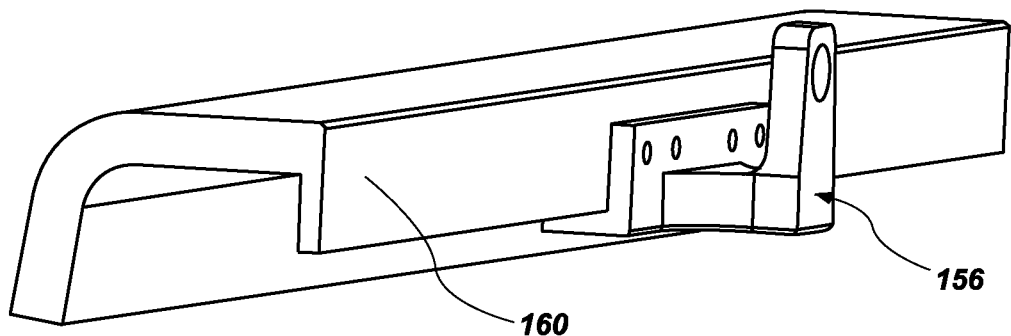
FIG. 28 is a perspective view of the latch post shown attached to the rail of the truck bed.

FIG. 28 is a perspective view of the latch post 156 shown attached to the rail 160 of the truck bed. The latch post 156 may be attached using set screws to prevent damage to the rail 160 and allow easy removal or adjustment of position along the rail. The hole 158 is also visible in the latch post 156 through which the rod 152 is inserted to lock the tonneau cover 10 to the rail 160.

Figure 29:
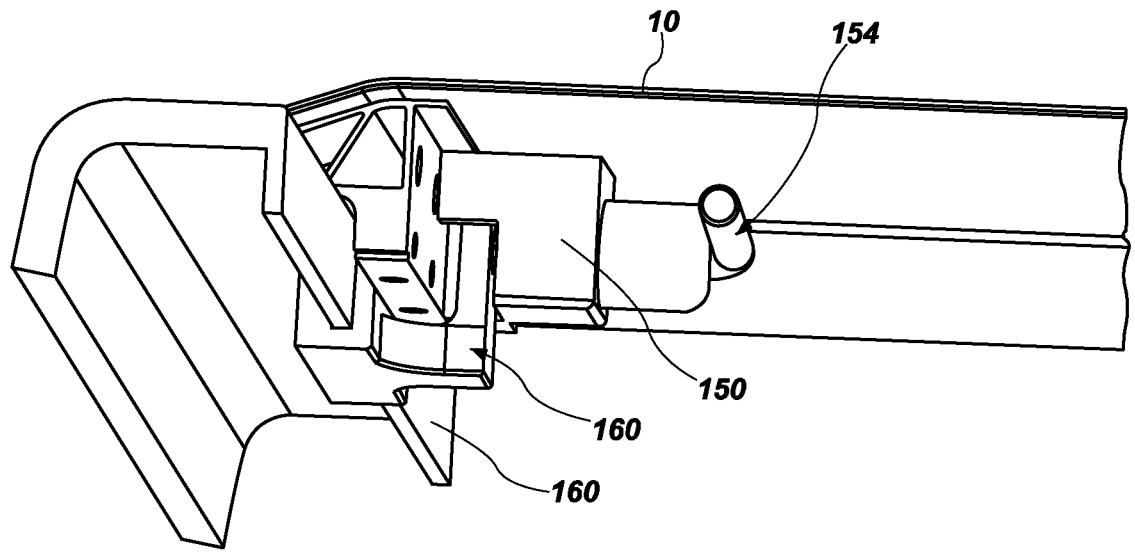
FIG. 29 is a perspective view that shows the latch, the lever arm, the latch post, the rail, and the underside of the tonneau cover to which the latch is attached.

FIG. 29 is a perspective view that shows the latch 150, the lever arm 154, the latch post 156, the rail 160, and the underside of the tonneau cover 10 to which the latch is attached.

Figure 30:
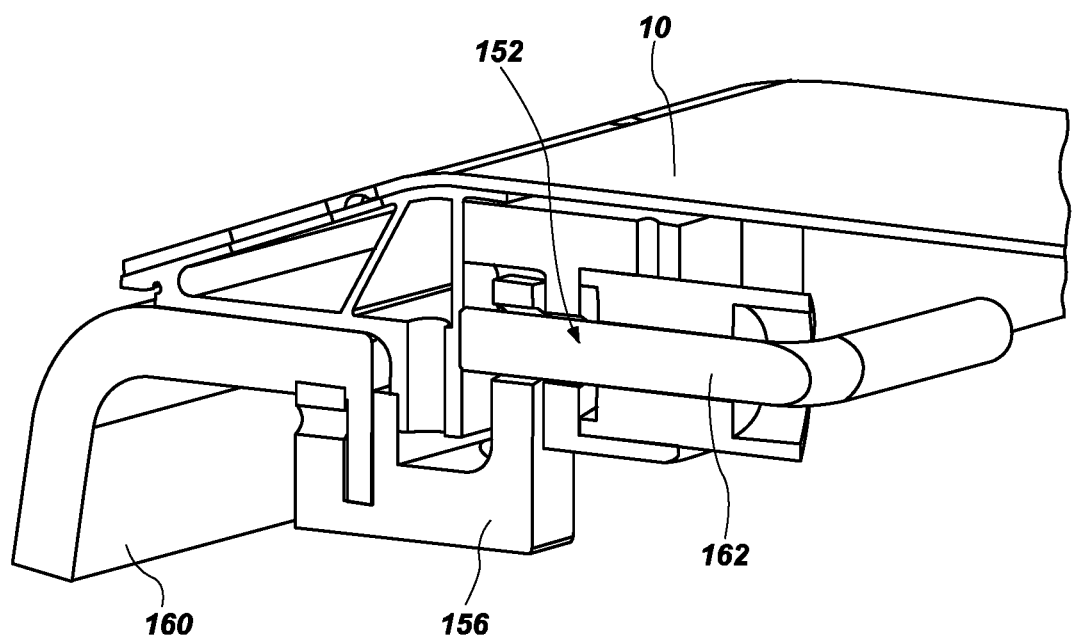
FIG. 30 is provided as a cross-sectional perspective view of the assembly shown in FIG. 29.

FIG. 30 is provided as a cross-sectional perspective view of the assembly shown in FIG. 29, also showing a spring 162 as part of the latch 150.

Figure 31:
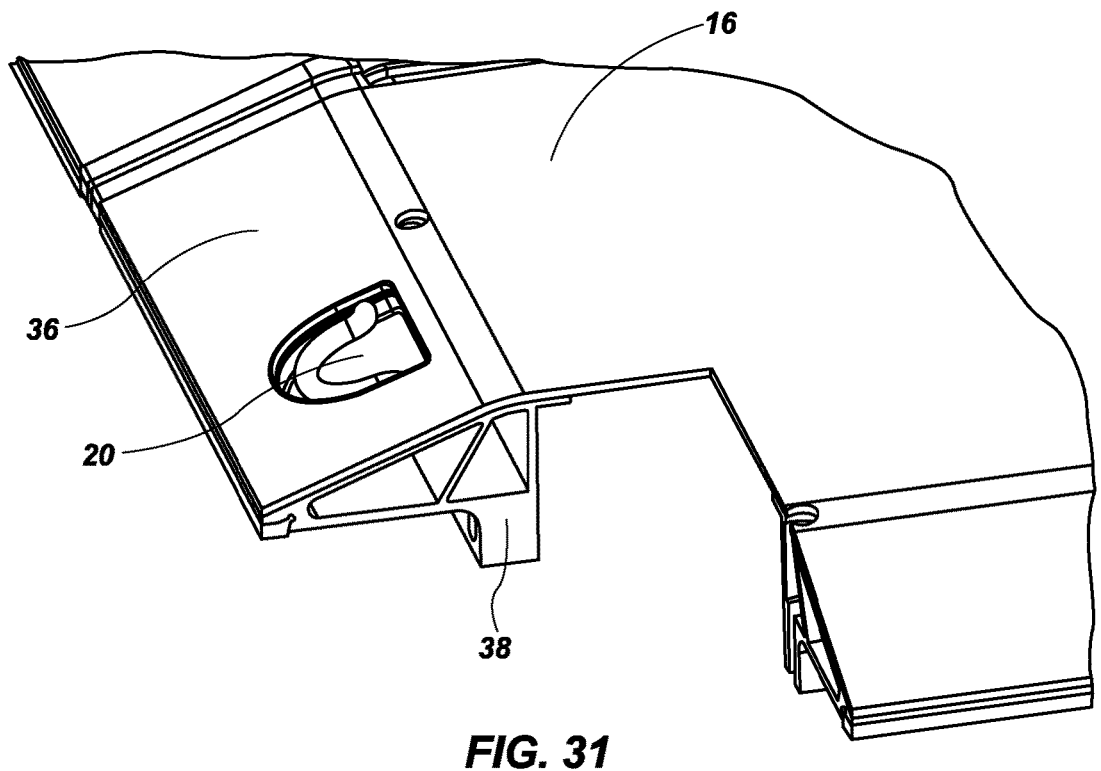
FIG. 31 is provided as a cross-sectional perspective view of a tonneau cover using D rings as the attachment system.

FIG. 31 is provided as a different perspective view of the embodiment of the invention shown in FIGS. 6 and 7. This figure shows a foldable section 16 of the tonneau cover 10. FIG. 31 also shows a perspective view of the edge extrusion 38 and the tread plate 36 (also called the tonneau surface) that may be extended over the edge extrusion in a cut-away view. This view also shows a D ring 20 that is disposed within a recess on the tread plate 36.

The costs associated with this concept may include the cost of tread plate 36 over the edge extrusion 38, the cost to bend the tread plate, the cost to laser cut the D ring 20 profile in the tread plate, the cost to friction stir weld the outer edge of the tread plate to the outside of the edge extrusion, and the material and labor cost of the D ring assembly 20. While the D ring 20 is an innovative and aesthetically pleasing solution to tying down loads on the top of the load bearing cover, it may not be economically viable for lighter duty pickup trucks.

Figure 32:
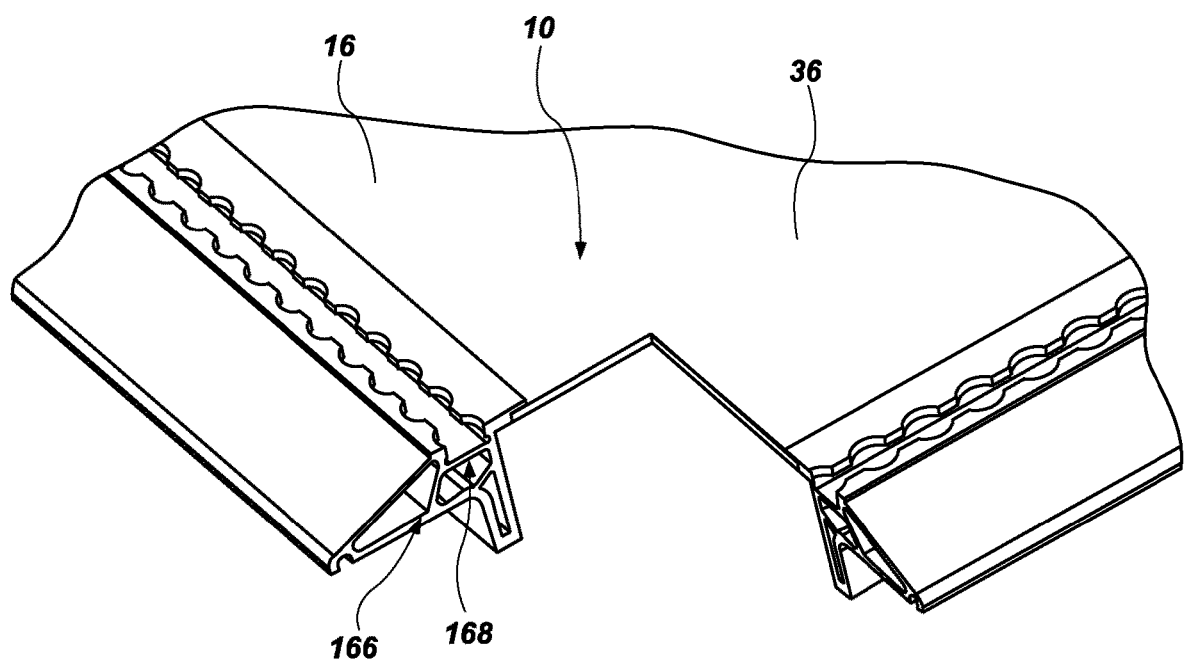
FIG. 32 is provided as a cross-sectional perspective view of a new embodiment of an attachment system on the tonneau cover using an integral track.

FIG. 31 is provided as a contrast to a new embodiment of the tonneau cover 10 that includes novel concepts that dramatically reduce costs and enhances tie down locations, including a new attachment system that is shown in FIG. 32.

FIG. 32 shows that the new embodiment includes a modified edge extrusion 166. A new feature of the edge extrusion 166 is the inclusion of an integral track 168. After the edge extrusion 166 is cut to length, circular holes may be machined to allow standard hardware to be attached for securing a load on the top of the tonneau cover 10.

The new embodiment shows the use of an "L track" as the integral track 166 that is disposed in the folding section 16. However, it should be understood that there are other types of track that perform the same function but may have slightly different top profiles. These other tracks may include E track, O track, etc. It should be understood that any of these commercially available off-the-shelf tracks may be integrated into the tonneau cover 10.

Some of the advantages of the integral track 168 in this new embodiment of an attachment system include but should not be considered as limited to the creation of many more attachment locations, eliminating the bending and laser cutting of a trade plate resulting in a single flat trade plate 36 in each folding section 16, and reducing the amount of material needed for construction of the tonneau cover 10.

Figure 33:
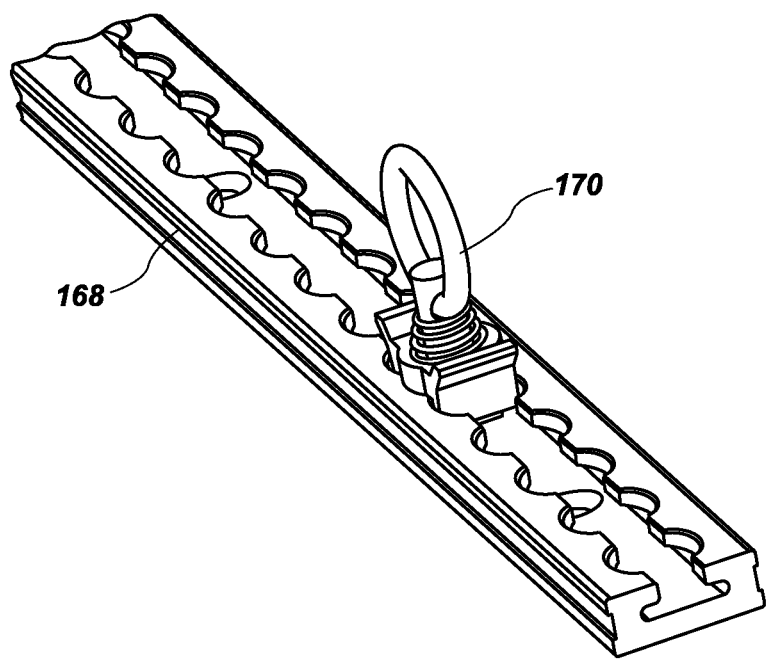
FIG. 33 is provided as a perspective view of the integral track and a movable latch ring.

FIG. 33 is provided as a perspective view of the integral track 168 before it is friction stir welded into the tonneau cover 10. Instead of D rings, an attachment point is an easily movable ring latch 170. This type of ring latch 170 is a commercially available item that may be purchased off-the-shelf. While this ring latch 170 is being shown in this new embodiment, any latch that can slide along the integral track 168 and then be locked into place when in use may be substituted for the ring latch 170 in FIG. 33. It is noted that a user only has to push down on the ring latch 170 and then slide it along the integral track 168 to a new location, then release the ring latch to enable it to lock into a new location.

Figure 34:
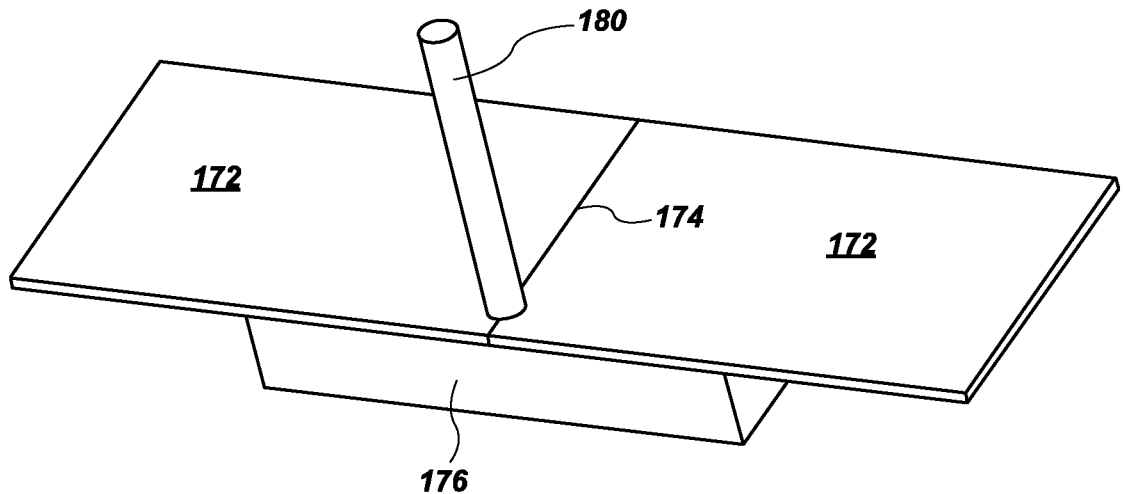
FIG. 34 is a perspective view of a prior art view of an FSW tool being used to friction stir weld a butt joint between two thin sheets of aluminum using an anvil to react forces.

The integral track 168 may be attached to the folding section 16 using friction stir welding. Friction Stir Welding (FSW) has been used for over 20 years to join aluminum and aluminum alloys. Those experienced in the FSW art dictate that FSW must be performed using an axial "forging" force on a rotating tool with a shoulder and pin as shown in FIGS. 33 and 34. This is necessary to trap and forge material flowing around to pin between the shoulder and the anvil. This "forging force" is the shoulder action that consolidates material flow to form the joint.

FIG. 34 is a perspective view showing a FSW tool 180, two thin aluminum sheets 172, a butt joint 174 and an anvil 176 for supporting the thin aluminum sheets and the FSW tool during FSW of the butt joint.

Figure 35:
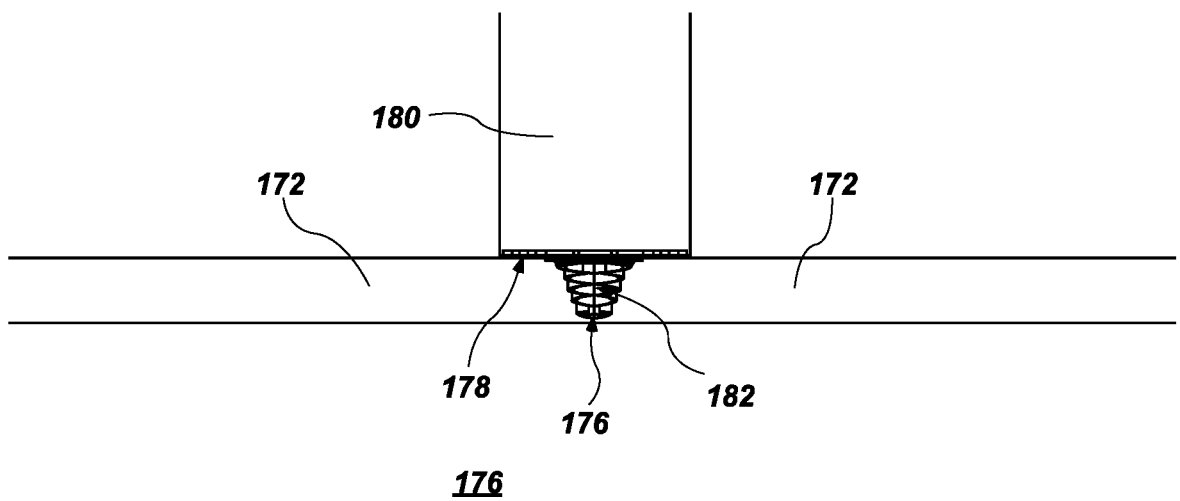
FIG. 35 is a cross-sectional view of the butt joint of FIG. 34.

FIG. 35 shows in a profile view the FSW tool 170, the two thin aluminum sheets 172, the anvil 176, and a shoulder 178 and pin 182 of the FSW tool that is performing FSW of the butt joint 174.

Figure 36:
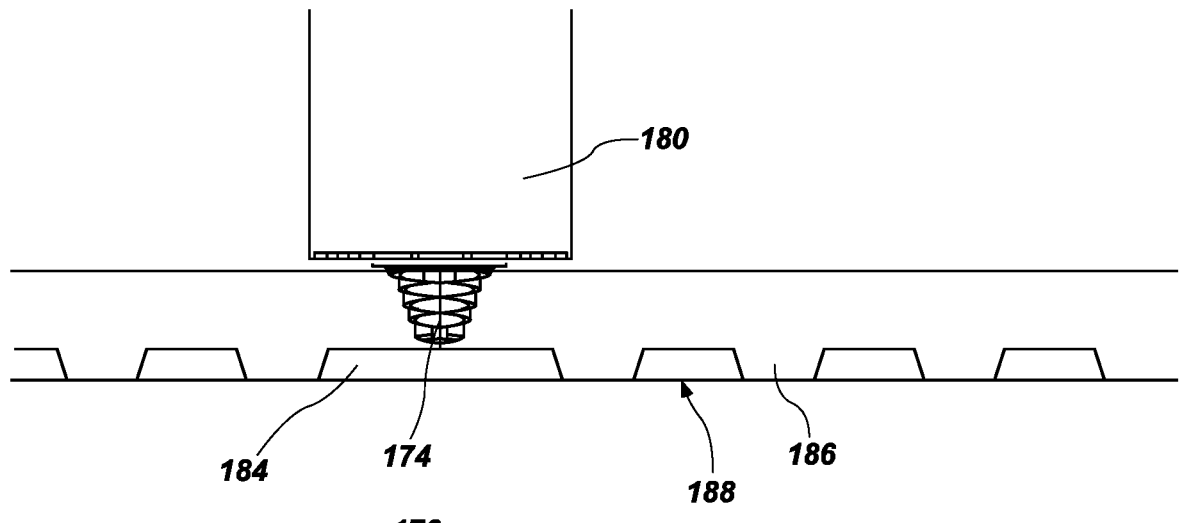
FIG. 36 is a cross sectional view of the problem using conventional FSW techniques and FSW tool when there are voids in the surface of thin aluminum sheets being joined.

Those practicing FSW of thin sheet material in the prior art may recognize that thin sheets must be heavily clamped along the entire edge of each piece being joined. This is necessary to prevent the thin sheets from lifting, deforming and moving during FSW under high forging forces. Further, it is impossible to FSW aluminum sheets without the continuous support of an anvil to restrict any downward flow of aluminum. This alone may eliminate the possibility of using conventional FSW to join tread plates together because of the void 184 between the anvil 176 and bottom tread plate surface 188 created by the protruding diamond tread 186 as shown in FIG. 36.

A radical change in thinking lead to a novel approach to tool design and FSW parameter development to allow thin sheet material to be joined. The following description explains how this is possible.

Figure 37:
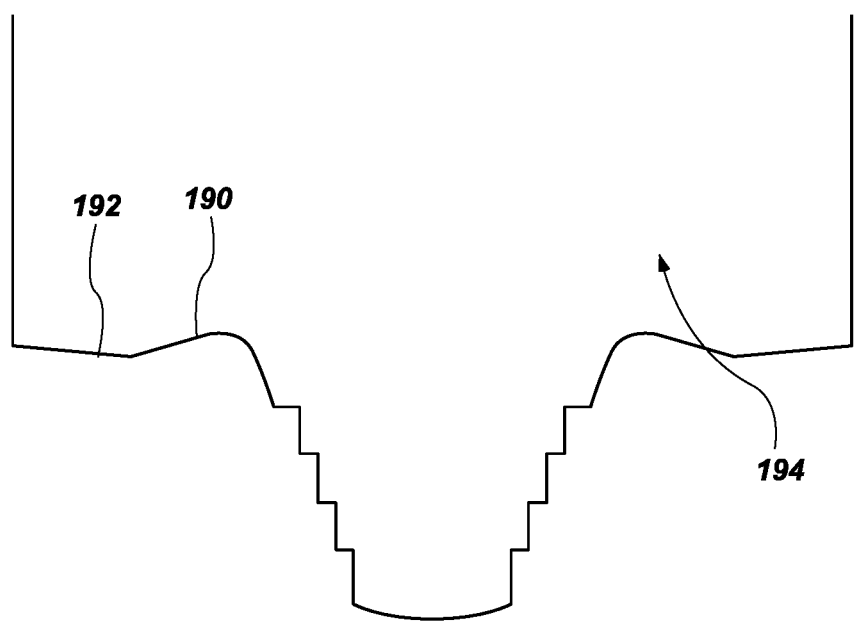
FIG. 37 is a cross-sectional profile view of the geometry of a new FSW tool that may be used to join thin aluminum sheets with a reduced axial load on the FSW tool.

FIG. 37 shows that the FSW paradigm was changed by eliminating the "forging" force approach and replacing it with a "sealing" approach. This meant tool geometry of a new FSW tool needed to be altered to reduce tool axial loading with features that sealed and contained material at substantially reduced axial loads.

FIG. 37 shows how this was achieved. A pocket 190 within a shoulder 192 of the new FSW tool 194 fills with plasticized aluminum during FSW and may create a metal seal. The metal seal can only be achieved by reducing axial tool loads along with altering tool rotational speeds and feeds. Butt, lap and butt/lap joints may now be achieved.

FIGS. 17 to 29 are directed to different embodiments of a latch assembly for attaching the tonneau cover to a truck bed rail. One component that is shown is a latch receiver 144 that is coupled to the bed rail and provides a connection point for a latch that is mounted on the bottom of the tonneau cover 10. However, the latch receiver may be modified as shown in another embodiment of the invention as shown in FIGS. 38 and 39.

Figure 38:
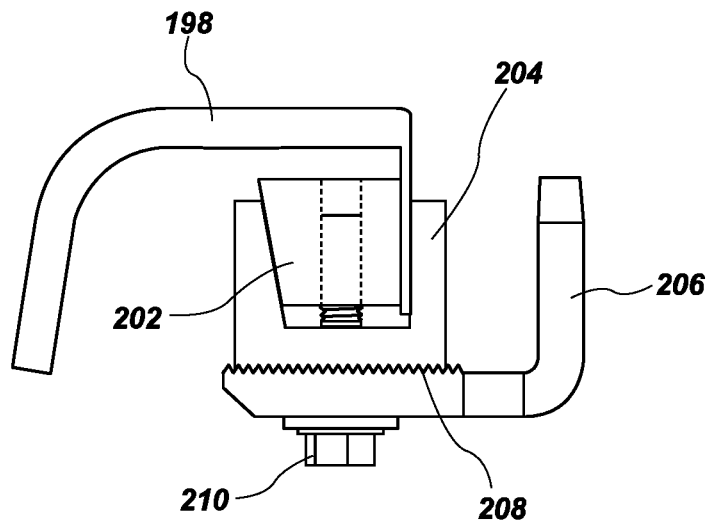
FIG. 38 is a profile view of a new adjustable latch system that may be used to attach a latch receiver to any truck rail bed regardless of differences in truck rail bed taper.

FIG. 38 is a profile view of another embodiment of an adjustable latch system 200 that are coupled to the truck bed rail 198. This figure shows in a profile view the components of the adjustable latch system 200. These components include a wedge lock 202, a clamping bracket 204 that engages the truck bed rail 198 and the wedge lock, a bracket 206 that extends away from the truck bed rail and engages the tonneau cover 10, a plurality of lateral adjustment serrations 208 and bolts 210 for securing the adjustable latch system 200 to the truck bed rail.

Figure 39:
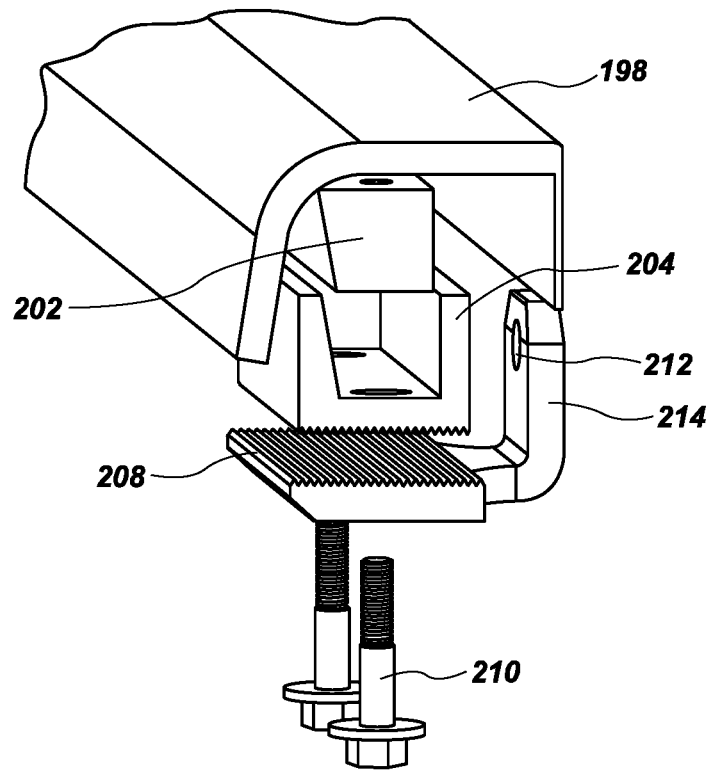
FIG. 39 is an exploded perspective view of the adjustable latch system shown in FIG. 38.

FIG. 39 is an exploded perspective view of the same components, including the wedge lock 202, the clamping bracket 204, the bracket 206 that engages tonneau cover 10, the plurality of lateral adjustment serrations 208 and the bolts 210 for securing the adjustable latch system 200.

The bracket 206 that engages the tonneau cover 10 is adjusted laterally either towards or away from the truck bed rail 198 by matching serrations 208 to account for truck bed rail 198 taper that is present in every truck model. A slide bolt (not shown) on the tonneau cover 10 passes through a hole 212 in a vertical section 214 of the bracket 206 to secure the tonneau cover 10 to the bracket. Once the bracket 206 is positioned for engagement with the Tonneau cover latch, the bolts 210 are tightened. As the bolts 210 are tightened, the wedge lock 202 is drawn down to clamp against the truck bed rail 198. The clamping bracket 204 in turn reacts the force generated by the wedge lock 202 to secure the bracket 206 to the bed rail 198. Further adjustment may be achieved by moving the assembly of the wedge lock 202, the clamping bracket 204 and the bracket 206 vertically prior to drawing the wedge lock 202 tight against the clamping bracket 204 and the truck bed rail 198.

Figure 40:
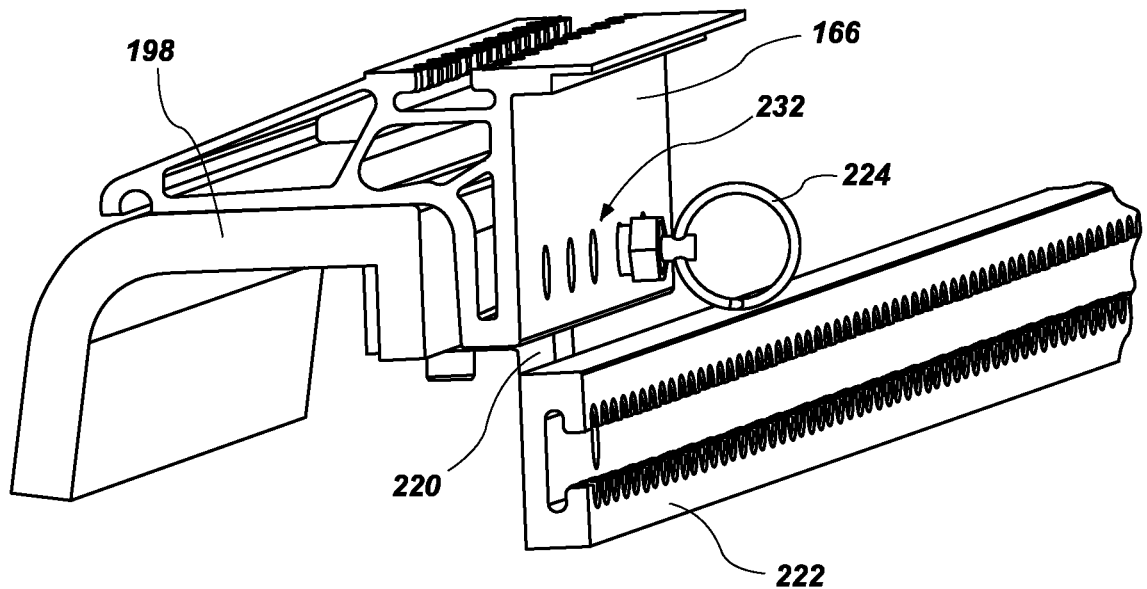
FIG. 40 is a perspective view of another alternative embodiment of a new adjustable latch system that may be used to attach a latch receiver to any truck rail bed regardless of differences in truck rail bed taper.

FIG. 40 is a perspective view of another alternative embodiment of a new adjustable latch system that may be used to attach a latch receiver to any truck rail bed regardless of differences in truck rail bed taper.

FIG. 40 shows that a new wedge lock clamp 220 is now attached to the truck bed rail 198. The wedge lock clamp provides attachment points for the tonneau cover 10 to attach to. This figure also shows a spring plunger latch 224 that attaches the tonneau cover 10 to the wedge lock clamp 224 through holes 232 in the edge extrusion 166.

Figure 41:
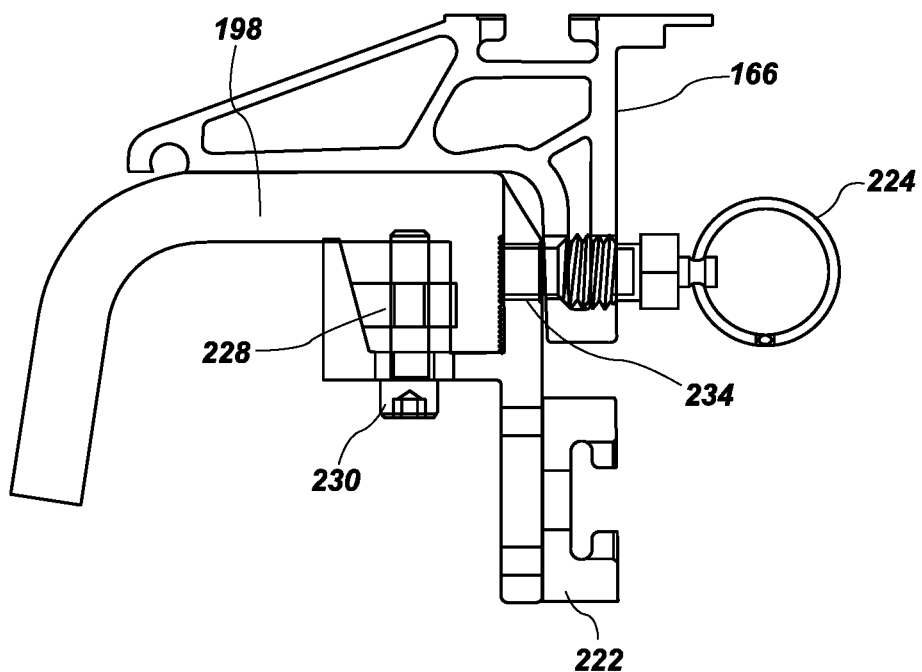
FIG. 41 is a cross-sectional profile view of the adjustable latch system of FIG. 40.

FIG. 41 is a cross-sectional profile view of the adjustable latch system of FIG. 40. FIG. 41 shows that the spring plunger latch 224 is threaded to the edge extrusion 166 and passes moving portion of the spring plunge latch through to a hole 234 in the wedge lock clamp 224.

The wedge lock clamp 224 is coupled to the truck bed rail 198 using a wedge 228 and a bolt 230. A vertical tab 226 is also added to the wedge lock clamp 220 in order to attach an L track 222. The L track 222 provides a way to secure a load while the tonneau cover 10 is open and tie down points are needed. It also allows attachment of hardware (gas struts and remote control lock) to open the section of the tonneau cover 10 that is nearest to the cab.

Figure 42:
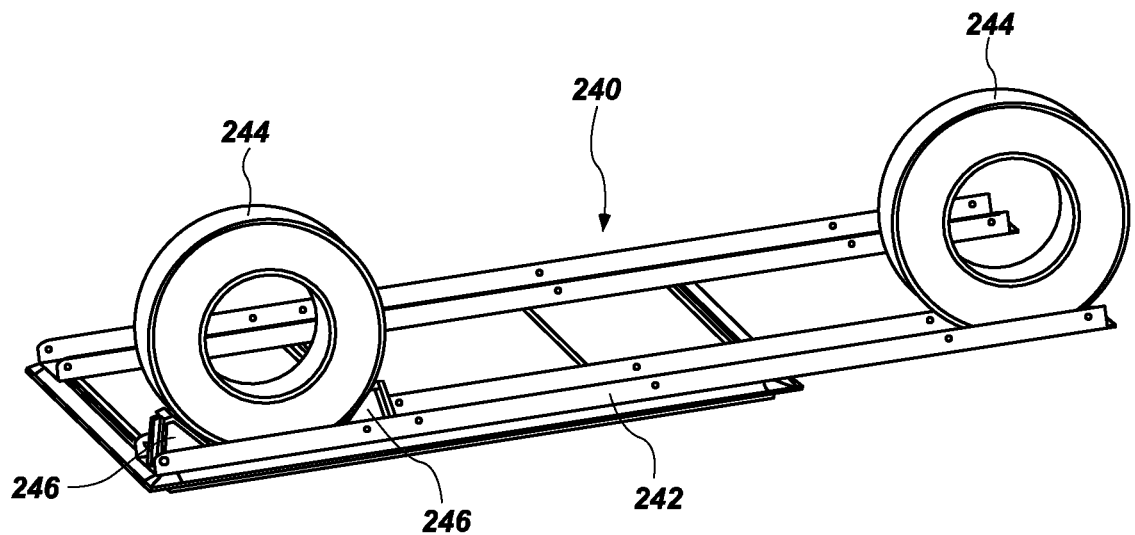
FIG. 42 is a perspective view of a framework that may be attached to the top of the tonneau cover to provide a secure mount for a vehicle such as a UTV or snowmobile.

FIG. 42 is a perspective view of a framework 240 that may be attached to the top of the tonneau cover to provide a secure mount for a vehicle such as a UTV or snowmobile.

It may be desirable to load a vehicle on the tonneau cover that extends beyond the bed of the truck. This may be accomplished by attached a support framework that is easily attached and removed from the tonneau cover 10. The framework may be wider, longer or both wider and longer than the truck bed and the tonneau cover. What this invention may provide is a means for attaching and removing a frame quickly and easily.

This figure shows a U-channel 242 that is bolted to the top of the tonneau cover using the integral L track 168. This figure shows two wheels 244 of a UTV or another vehicle disposed in the U-channel 242. This figure shows that chocks 246 are disposed in front and behind a wheel 244 in the U-channel 242.

Figure 43:
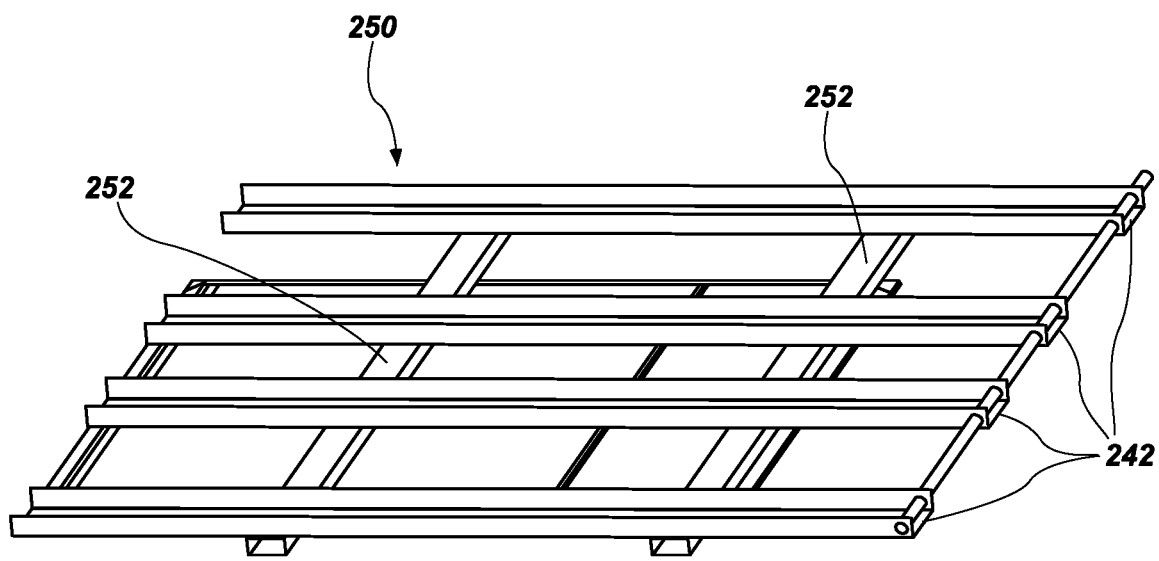
FIG. 43 is a perspective view of a framework for two small vehicles or one larger vehicle to be mounted to the top of the tonneau cover.

FIG. 43 is a perspective view of a framework 250 for two small vehicles or one larger vehicle to be mounted to the top of the tonneau cover. The framework of this two-vehicle carrier 250 may include cross-beams 252 for structural support of the U-channels 242.

A final aspect of the invention is that the tonneau cover 10 may include a rounded and raised center line down the length. A rounded center line provides a natural path for liquid such as rain to drain off of either side of the tonneau cover 10.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A tonneau cover that may be used to transport another vehicle, said tonneau cover comprised of:
   a plurality of tonneau sections, wherein each of the tonneau sections is constructed using friction stir welds, each of the tonneau sections including a hinge at each edge where it is joined to an adjacent tonneau section, and each of the hinges being joined to the respective tonneau sections using friction stir welding;
   an integral track disposed along at least a portion of the tonneau cover, wherein the integral track provides a plurality of attachments points along a length thereof;
   a removable framework disposed on top of the plurality of tonneau sections, wherein the removable framework is attached to the tonneau cover using the integral track, and wherein the removable framework is comprised of at least one U-channel that provides a location for wheels or skis of a vehicle.

2. The tonneau cover as defined in claim 1 wherein the removable framework is longer than the tonneau cover and extends beyond a length of a truck bed.

3. The tonneau cover as defined in claim 2 wherein the removable framework is wider than the tonneau cover and extends beyond a width of the truck bed.

4. The tonneau cover as defined in claim 1 wherein the removable framework is further comprised of at least one chock for securing the wheel or the ski to the at least one U-channel.

5. The tonneau cover as defined in claim 1 wherein the removable framework is further comprised of at least one U channel for a vehicle.

6. The tonneau cover as defined in claim 1 wherein the removable framework is further comprised of at least two U channels for a vehicle.

7. The tonneau cover as defined in claim 1 wherein the removable framework is further comprised of at least four U channels for at least two vehicles that are disposed side-by-side on the tonneau cover.

8. The tonneau cover as defined in claim 1 wherein the removable framework is further comprised of at least two cross-beams.

9. A method for transporting at least one vehicle on a tonneau cover, said method comprising:
   providing a plurality of tonneau sections, wherein each of the tonneau sections is constructed using friction stir welds, each of the tonneau sections including a hinge at each edge where it is joined to an adjacent tonneau section, and each of the hinges being joined to the respective tonneau sections using friction stir welding;
   providing an integral track disposed along at least a portion of the tonneau cover, wherein the integral track provides a plurality of attachments points along a length thereof;
   providing a removable framework disposed on top of the plurality of tonneau sections, wherein the removable framework is attached to the tonneau cover using the integral track, and wherein the removable framework is comprised of at least one U-channel that provides a location for wheels or skis of a vehicle; and
   disposing at least one vehicle on the tonneau cover and on the removable framework.

* * * * *